(12) United States Patent
Wang et al.

(10) Patent No.: US 11,956,850 B2
(45) Date of Patent: *Apr. 9, 2024

(54) USER-EQUIPMENT-COORDINATION SET FOR DISENGAGED MODE

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 17/603,328

(22) PCT Filed: May 6, 2020

(86) PCT No.: PCT/US2020/031716
§ 371 (c)(1),
(2) Date: Oct. 12, 2021

(87) PCT Pub. No.: WO2020/236429
PCT Pub. Date: Nov. 26, 2020

(65) Prior Publication Data
US 2022/0191967 A1    Jun. 16, 2022

Related U.S. Application Data

(63) Continuation of application No. 16/419,854, filed on May 22, 2019, now Pat. No. 10,893,572.

(51) Int. Cl.
*H04W 76/28* (2018.01)
*H04W 4/06* (2009.01)
(Continued)

(52) U.S. Cl.
CPC ............ *H04W 76/28* (2018.02); *H04W 4/06* (2013.01); *H04W 36/0016* (2013.01);
(Continued)

(58) Field of Classification Search
CPC ... H04W 76/28; H04W 4/06; H04W 36/0016; H04W 52/0219; H04W 52/0229;
(Continued)

(56) References Cited

U.S. PATENT DOCUMENTS 6,038,448 A    3/2000   Chheda et al.
6,665,521 B1   12/2003  Gorday et al.
(Continued)

FOREIGN PATENT DOCUMENTS

CN    101764634    6/2010
CN    101867451    10/2010
(Continued)

OTHER PUBLICATIONS

"International Preliminary Report on Patentability", Application No. PCT/US2020/031716, Oct. 15, 2021, 7 pages.
(Continued)

*Primary Examiner* — Deepa Belur
(74) *Attorney, Agent, or Firm* — Colby Nipper PLLC

(57) ABSTRACT

This document describes techniques and apparatuses for a user-equipment-coordination set for disengaged mode. In aspects, a base station forms a disengaged-mode-user-equipment coordination set including multiple user equipment operating in a disengaged mode. The disengaged-mode-user-equipment coordination set uses joint transmission and reception to communicate with the base station. The base station communicates control-plane information to an individual user equipment or multiple user equipment in the disengaged-mode-user-equipment coordination set.

20 Claims, 8 Drawing Sheets

(51) Int. Cl.
  *H04W 36/00* (2009.01)
  *H04W 52/02* (2009.01)
  *H04W 68/10* (2009.01)
  *H04W 72/121* (2023.01)
  *H04W 72/23* (2023.01)
  *H04W 76/27* (2018.01)

(52) U.S. Cl.
  CPC ... *H04W 52/0219* (2013.01); *H04W 52/0229* (2013.01); *H04W 68/10* (2013.01); *H04W 72/121* (2013.01); *H04W 72/23* (2023.01); *H04W 76/27* (2018.02)

(58) Field of Classification Search
  CPC ... H04W 68/10; H04W 72/121; H04W 72/23; H04W 76/27
  See application file for complete search history.

(56) References Cited

U.S. PATENT DOCUMENTS

| | | |
|---|---|---|
| 6,898,430 B1 | 5/2005 | Liberti et al. |
| 8,023,463 B2 | 9/2011 | Dick et al. |
| 8,315,629 B2 | 11/2012 | Pamp et al. |
| 8,483,184 B2 | 7/2013 | Yokoyama et al. |
| 8,559,992 B2 | 10/2013 | Larsson et al. |
| 8,665,806 B2 | 3/2014 | Wang et al. |
| 8,706,156 B2 | 4/2014 | Han et al. |
| 9,008,678 B2 | 4/2015 | Schoenerstedt |
| 9,036,613 B2 | 5/2015 | Bleugels et al. |
| 9,100,095 B2 | 8/2015 | Mantri |
| 9,210,550 B2 | 12/2015 | Koc et al. |
| 9,253,783 B2 | 2/2016 | Wang et al. |
| 9,271,194 B2 | 2/2016 | Lu et al. |
| 9,344,159 B2 | 5/2016 | Zhuang |
| 9,374,772 B2 | 6/2016 | Daoud |
| 9,380,533 B2 | 6/2016 | Chung et al. |
| 9,674,863 B2 | 6/2017 | Cheng et al. |
| 9,699,731 B2 | 7/2017 | Khoryaev et al. |
| 9,743,329 B2 | 8/2017 | Xiao et al. |
| 9,780,842 B2 | 10/2017 | Boudreau et al. |
| 9,941,939 B2 | 4/2018 | Park et al. |
| 9,985,750 B2 | 5/2018 | Maaref et al. |
| 10,045,376 B2 | 8/2018 | Yang et al. |
| 10,178,696 B2 | 1/2019 | Cheng et al. |
| 10,201,003 B2 | 2/2019 | Guo et al. |
| 10,218,422 B2 | 2/2019 | Raghavan et al. |
| 10,313,950 B2 | 6/2019 | Choi et al. |
| 10,321,414 B2 | 6/2019 | Guo et al. |
| 10,412,691 B1 | 9/2019 | Marupaduga et al. |
| 10,542,556 B2 | 1/2020 | Mallik |
| 10,834,645 B2 | 11/2020 | Wang et al. |
| 10,893,572 B2 | 1/2021 | Wang et al. |
| 11,134,092 B2 * | 9/2021 | Bender ............... H04L 67/303 |
| 11,638,272 B2 | 4/2023 | Wang et al. |
| 11,641,566 B2 | 5/2023 | Wang et al. |
| 11,889,322 B2 | 1/2024 | Wang et al. |
| 2003/0002460 A1 | 1/2003 | English |
| 2004/0203973 A1 | 10/2004 | Khan |
| 2004/0233858 A1 | 11/2004 | Karaoguz |
| 2006/0116156 A1 | 6/2006 | Haseba et al. |
| 2006/0128312 A1 | 6/2006 | Declerck et al. |
| 2006/0203731 A1 | 9/2006 | Tiedemann et al. |
| 2007/0223423 A1 | 9/2007 | Kim et al. |
| 2009/0175214 A1 | 7/2009 | Sfar et al. |
| 2009/0176494 A1 | 7/2009 | Lee et al. |
| 2010/0027487 A1 | 2/2010 | Ihm et al. |
| 2010/0103983 A1 | 4/2010 | Wang et al. |
| 2010/0118752 A1 | 5/2010 | Suzuki et al. |
| 2010/0142462 A1 | 6/2010 | Wang et al. |
| 2010/0173660 A1 | 7/2010 | Liu et al. |
| 2010/0210246 A1 | 8/2010 | Yang et al. |
| 2011/0080893 A1 | 4/2011 | Fong et al. |
| 2011/0096751 A1 | 4/2011 | Ma et al. |
| 2011/0124294 A1 | 5/2011 | Dwyer et al. |
| 2011/0158117 A1 | 6/2011 | Ho et al. |
| 2011/0281585 A1 | 9/2011 | Kwon et al. |
| 2012/0087273 A1 | 4/2012 | Koo et al. |
| 2012/0102409 A1 | 4/2012 | Fan et al. |
| 2012/0120821 A1 | 5/2012 | Kazmi et al. |
| 2012/0157139 A1 | 6/2012 | Noh et al. |
| 2012/0178462 A1 | 7/2012 | Kim |
| 2012/0218968 A1 | 8/2012 | Kim et al. |
| 2012/0264443 A1 | 10/2012 | Ng et al. |
| 2013/0034136 A1 | 2/2013 | Park et al. |
| 2013/0039287 A1 | 2/2013 | Rayavarapu et al. |
| 2013/0041954 A1 | 2/2013 | Kim et al. |
| 2013/0053045 A1 | 2/2013 | Chuang |
| 2013/0053079 A1 | 2/2013 | Kwun et al. |
| 2013/0089058 A1 | 4/2013 | Yang et al. |
| 2013/0107848 A1 | 5/2013 | Kang et al. |
| 2013/0122918 A1 | 5/2013 | Boley et al. |
| 2013/0130684 A1 | 5/2013 | Gomes et al. |
| 2013/0138817 A1 | 5/2013 | Zhang et al. |
| 2013/0150106 A1 | 6/2013 | Bucknell et al. |
| 2013/0182628 A1 | 7/2013 | Gholmieh et al. |
| 2013/0225184 A1 | 8/2013 | Liu et al. |
| 2013/0242787 A1 | 9/2013 | Sun et al. |
| 2013/0244682 A1 | 9/2013 | Schoenerstedt |
| 2013/0329711 A1 | 12/2013 | Seo et al. |
| 2014/0010131 A1 | 1/2014 | Gaal et al. |
| 2014/0112184 A1 | 4/2014 | Chai |
| 2014/0127991 A1 | 5/2014 | Lim et al. |
| 2014/0148168 A1 | 5/2014 | Aoyagi et al. |
| 2014/0169201 A1 | 6/2014 | Tamura et al. |
| 2014/0169261 A1 | 6/2014 | Ming et al. |
| 2014/0177456 A1 | 6/2014 | Boudreau et al. |
| 2014/0226575 A1 | 8/2014 | Davydov et al. |
| 2014/0269632 A1 | 9/2014 | Blankenship et al. |
| 2014/0274081 A1 | 9/2014 | Comeau et al. |
| 2014/0321433 A1 | 10/2014 | Xiao et al. |
| 2014/0348104 A1 | 11/2014 | Morita |
| 2014/0376478 A1 | 12/2014 | Morita |
| 2015/0038083 A1 | 2/2015 | Patro et al. |
| 2015/0043390 A1 | 2/2015 | Wang et al. |
| 2015/0065148 A1 | 3/2015 | De Pasquale et al. |
| 2015/0098397 A1 | 4/2015 | Damnjanovic et al. |
| 2015/0139197 A1 | 5/2015 | He et al. |
| 2015/0139203 A1 | 5/2015 | Miryala et al. |
| 2015/0163822 A1 | 6/2015 | Guo et al. |
| 2015/0195795 A1 | 7/2015 | Loehr et al. |
| 2015/0244489 A1 | 8/2015 | Wang |
| 2015/0288427 A1 | 10/2015 | Wang et al. |
| 2015/0326282 A1 | 11/2015 | Futaki |
| 2015/0358860 A1 | 12/2015 | Lu et al. |
| 2015/0373730 A1 | 12/2015 | Fujishiro et al. |
| 2015/0382142 A1 | 12/2015 | Kim et al. |
| 2016/0007138 A1 | 1/2016 | Palanisamy et al. |
| 2016/0021526 A1 | 1/2016 | Niu et al. |
| 2016/0021623 A1 | 1/2016 | Guo et al. |
| 2016/0028448 A1 | 1/2016 | Park et al. |
| 2016/0044634 A1 | 2/2016 | Seo et al. |
| 2016/0057604 A1 | 2/2016 | Luo et al. |
| 2016/0057663 A1 | 2/2016 | Teyeb et al. |
| 2016/0088642 A1 | 3/2016 | Yang et al. |
| 2016/0128123 A1 | 5/2016 | Li |
| 2016/0174278 A1 | 6/2016 | Gao et al. |
| 2016/0192420 A1 | 6/2016 | Kim et al. |
| 2016/0192433 A1 | 6/2016 | Deenoo et al. |
| 2016/0227463 A1 | 8/2016 | Baligh et al. |
| 2016/0323832 A1 | 11/2016 | Love et al. |
| 2016/0374026 A1 | 12/2016 | Dinan |
| 2017/0070931 A1 | 3/2017 | Huang et al. |
| 2017/0078333 A1 | 3/2017 | Tevlin |
| 2017/0086061 A1 | 3/2017 | Huang et al. |
| 2017/0105147 A1 | 4/2017 | Jiang et al. |
| 2017/0148173 A1 | 5/2017 | Kosmecki et al. |
| 2017/0164252 A1 | 6/2017 | Chaudhuri et al. |
| 2017/0188206 A1 | 6/2017 | Schmitt et al. |
| 2017/0188406 A1 | 6/2017 | Baligh et al. |
| 2017/0230986 A1 | 8/2017 | Moon et al. |
| 2017/0250786 A1 | 8/2017 | Better et al. |
| 2017/0290030 A1 | 10/2017 | Wang et al. |
| 2017/0332389 A1 | 11/2017 | Sun et al. |

(56) References Cited

U.S. PATENT DOCUMENTS

| | | |
|---|---|---|
| 2017/0339530 A1 | 11/2017 | Maaref |
| 2017/0359759 A1 | 12/2017 | Brown et al. |
| 2018/0013533 A1 | 1/2018 | Yang et al. |
| 2018/0027393 A1 | 1/2018 | Yang et al. |
| 2018/0062770 A1 | 3/2018 | Reial et al. |
| 2018/0115932 A1 | 4/2018 | Gomes et al. |
| 2018/0146471 A1 | 5/2018 | Xu et al. |
| 2018/0152949 A1 | 5/2018 | Guo et al. |
| 2018/0152951 A1 | 5/2018 | Zhuang et al. |
| 2018/0213450 A1 | 7/2018 | Futaki et al. |
| 2018/0220403 A1 | 8/2018 | Wilson et al. |
| 2018/0235020 A1 | 8/2018 | Maaref |
| 2018/0249483 A1* | 8/2018 | Chen .................... H04W 72/12 |
| 2018/0352511 A1 | 12/2018 | Martin et al. |
| 2019/0007844 A1 | 1/2019 | Müller et al. |
| 2019/0028348 A1 | 1/2019 | Chai |
| 2019/0053235 A1 | 2/2019 | Novlan et al. |
| 2019/0075581 A1 | 3/2019 | Salem et al. |
| 2019/0075604 A1 | 3/2019 | Wang et al. |
| 2019/0081657 A1 | 3/2019 | Zeng et al. |
| 2019/0082331 A1 | 3/2019 | Raghavan et al. |
| 2019/0082371 A1* | 3/2019 | Burt ....................... H04W 36/30 |
| 2019/0082428 A1 | 3/2019 | Maaref et al. |
| 2019/0110318 A1 | 4/2019 | Zhang et al. |
| 2019/0132882 A1 | 5/2019 | Li et al. |
| 2019/0165843 A1 | 5/2019 | Wu et al. |
| 2019/0174346 A1 | 6/2019 | Murray et al. |
| 2019/0174472 A1 | 6/2019 | Lee et al. |
| 2019/0215048 A1 | 7/2019 | Cirik et al. |
| 2019/0253106 A1 | 8/2019 | Raghavan et al. |
| 2019/0312616 A1 | 10/2019 | Christoffersson et al. |
| 2019/0363843 A1 | 11/2019 | Gordaychik |
| 2020/0015192 A1 | 1/2020 | Chun |
| 2020/0022043 A1 | 1/2020 | Pelletier et al. |
| 2020/0022174 A1 | 1/2020 | Karaki et al. |
| 2020/0037119 A1 | 1/2020 | Yang |
| 2020/0092685 A1 | 3/2020 | Fehrenbach et al. |
| 2020/0137591 A1 | 4/2020 | Smith et al. |
| 2020/0154442 A1 | 5/2020 | Zhou |
| 2020/0178131 A1 | 6/2020 | Wang et al. |
| 2020/0187281 A1 | 6/2020 | Wang et al. |
| 2020/0322962 A1 | 10/2020 | Wang et al. |
| 2020/0329503 A1 | 10/2020 | Da Silva et al. |
| 2020/0374970 A1* | 11/2020 | Wang .................... H04W 76/14 |
| 2020/0396763 A1 | 12/2020 | Lee et al. |
| 2021/0028978 A1 | 1/2021 | Zhou et al. |
| 2021/0029516 A1 | 1/2021 | Wang et al. |
| 2021/0160850 A1 | 5/2021 | Akkarakaran et al. |
| 2021/0345358 A1 | 11/2021 | Wang et al. |
| 2021/0385903 A1 | 12/2021 | Wang et al. |
| 2022/0006493 A1* | 1/2022 | Wang ..................... H04B 7/024 |
| 2022/0052745 A1* | 2/2022 | Li ........................ H04B 7/0456 |
| 2022/0086653 A1 | 3/2022 | Wang et al. |
| 2022/0141676 A1 | 5/2022 | Wang et al. |

FOREIGN PATENT DOCUMENTS

| | | |
|---|---|---|
| CN | 102577150 A | 7/2012 |
| CN | 102595429 | 7/2012 |
| CN | 102638297 | 8/2012 |
| CN | 103313197 | 9/2013 |
| CN | 103858475 A | 6/2014 |
| CN | 104429142 | 3/2015 |
| CN | 104641570 A | 5/2015 |
| CN | 104756425 | 7/2015 |
| CN | 104885391 | 9/2015 |
| CN | 107135490 | 9/2017 |
| CN | 107211271 | 9/2017 |
| CN | 107872889 | 4/2018 |
| CN | 109246708 | 1/2019 |
| CN | 109314561 | 2/2019 |
| CN | 109417409 | 3/2019 |
| EP | 2809104 | 12/2014 |
| EP | 2953393 | 12/2015 |
| EP | 3282786 | 2/2018 |
| EP | 3425936 | 1/2019 |
| KR | 20080089457 | 10/2008 |
| KR | 20090118058 | 11/2009 |
| WO | 0237771 | 5/2002 |
| WO | 2008147654 | 12/2008 |
| WO | 2011140715 | 11/2011 |
| WO | 2012114151 | 8/2012 |
| WO | 2013057047 | 4/2013 |
| WO | 2013091229 | 6/2013 |
| WO | 2014074919 | 5/2014 |
| WO | 2014165086 | 10/2014 |
| WO | 2014179958 | 11/2014 |
| WO | 2015074270 | 5/2015 |
| WO | 2015123405 | 8/2015 |
| WO | 2015163798 | 10/2015 |
| WO | 2016081375 | 5/2016 |
| WO | 2016191091 | 12/2016 |
| WO | 2017023785 | 2/2017 |
| WO | 2017117253 | 7/2017 |
| WO | 2017117340 | 7/2017 |
| WO | 2017148173 | 9/2017 |
| WO | 2018010818 | 1/2018 |
| WO | 2016163206 | 2/2018 |
| WO | 2018020015 | 2/2018 |
| WO | 2018031770 | 2/2018 |
| WO | 2018044392 | 3/2018 |
| WO | 2018073485 | 4/2018 |
| WO | 2018130115 | 7/2018 |
| WO | 2018169343 | 9/2018 |
| WO | 2018192699 | 10/2018 |
| WO | 2018202797 | 11/2018 |
| WO | 2018202798 | 11/2018 |
| WO | 2019001039 | 1/2019 |
| WO | 2019016141 | 1/2019 |
| WO | 2019038700 | 2/2019 |
| WO | 2018025789 | 5/2019 |
| WO | 2020112680 | 6/2020 |
| WO | 2020113010 | 6/2020 |
| WO | 2020117558 | 6/2020 |
| WO | 2020139811 | 7/2020 |
| WO | 2020142532 | 7/2020 |
| WO | 2020159773 | 8/2020 |
| WO | 2020172022 | 8/2020 |
| WO | 2020186097 | 9/2020 |
| WO | 2020236429 | 11/2020 |
| WO | 2021002859 | 1/2021 |
| WO | 2021015774 | 1/2021 |
| WO | 2012029879 | 2/2021 |
| WO | 2021054963 | 3/2021 |
| WO | 2021054964 | 3/2021 |
| WO | WO-2021054964 A1 * | 3/2021 .......... H04W 72/121 |
| WO | 2021080666 | 4/2021 |

OTHER PUBLICATIONS

"3GPP TS 24.501 V16.3.0", 3GPP TS 24.501 version 16.3.0, Dec. 2019, 645 pgs.

"3GPP TSG RAN WG4 25.942 V2.0.0: "RF System Scenarios"", TSG RAN Working Group 4 (Radio) Meeting #8, Oct. 1999, 65 pgs.

"3rd Generation Partnership Project; Technical Specification Group Services and System Aspects; Security architecture and procedures for 5G system", 3GPP TS 33.501 version 16.1.0 Release 16, Dec. 2019, 202 pgs.

"5G; Non-Access-Stratum (NAS) protocol for 5G System (5GS); Stage 3", 3GPP TS 24.501 version 15.1.0 Release 15, Oct. 2018, 406 pgs.

"5G; Study on New Radio (NR) Access Technology", ETSI TR 138 912; V14.0.0; Technical Report; 3GPP TR 38.912 version 14.0.0 Release 14, May 2017, 77 pgs.

"Beam Management and Beam Reporting", 3GPP TSG RAN WG1 Meeting #88bis, R1-1704488, Apr. 2017, 7 pgs.

"Corrected Notice of Allowance", U.S. Appl. No. 16/419,854, dated Dec. 16, 2020, 2 pgs.

"Discussion on HARQ Management and HARQ-ACK Feedback", 3GPP TSG RAN WG1 Meeting #91, R1-1720203, Dec. 2017, 5 pgs.

(56) References Cited

OTHER PUBLICATIONS

"Discussion on NR Beamforming with UE-Group-Specific Beam Sweeping", 3GPP TSG-RAN WG1 Meeting #86 R1-166219, Aug. 22, 2016, 7 pgs.
"Final Office Action", U.S. Appl. No. 16/210,969, dated Jan. 7, 2021, 17 pgs.
"Foreign Office Action(NEED Translation)", TW Application No. 20209124827, 8 pgs.
"International Preliminary Report on Patentability", Application No. PCT/US2019/069129, dated Apr. 7, 2021, 14 pgs.
"International Preliminary Report on Patentability", Application No. PCT/US2019/068265, dated Jan. 18, 2021, 20 pgs.
"International Preliminary Report on Patentability", Application No. PCT/US2020/031716, dated Jul. 30, 2021, 7 pgs.
"International Preliminary Report on Patentability", Application No. PCT/US2019/051980, dated Dec. 8, 2020, 7 pgs.
"International Preliminary Report on Patentability", Application No. PCT/US2019/063240, dated Feb. 18, 2021, 8 pgs.
"International Preliminary Report on Patentability", Application No. PCT/US2019/063620, dated May 25, 2021, 8 pgs.
"International Preliminary Report on Patentability", Application No. PCT/US2020/045777, dated Jun. 21, 2021, 8 pgs.
"International Preliminary Report on Patentability", Application No. PCT/US2020/022460, dated Aug. 25, 2021, 8 pgs.
"International Preliminary Report on Patentability", Application No. PCT/US2020/017930, dated Aug. 10, 2021, 9 pgs.
"International Search Report and Written Opinion", Application No. PCT/US2019/051980, dated Jul. 27, 2020, 19 pgs.
"International Search Report and Written Opinion", Application No. PCT/US2019/043355, dated Mar. 31, 2020, 12 pgs.
"International Search Report and Written Opinion", Application No. PCT/US2020/014638, dated May 13, 2020, 12 pgs.
"International Search Report and Written Opinion", Application No. PCT/US2020/045777, dated Oct. 9, 2020, 13 pgs.
"International Search Report and Written Opinion", Application No. PCT/US2019/069129, dated Mar. 31, 2020, 13 pgs.
"International Search Report and Written Opinion", Application No. PCT/US2019/046374, dated Apr. 14, 2020, 13 pgs.
"International Search Report and Written Opinion", Application No. PCT/US2020/022460, dated May 26, 2020, 13 pgs.
"International Search Report and Written Opinion", Application No. PCT/US2020/031716, dated Jul. 20, 2020, 14 pgs.
"International Search Report and Written Opinion", Application No. PCT/US2019/063081, dated Feb. 21, 2020, 14 pgs.
"International Search Report and Written Opinion", Application No. PCT/US2019/063620, dated Mar. 9, 2020, 14 pgs.
"International Search Report and Written Opinion", Application No. PCT/US2019/052005, dated May 18, 2020, 14 pgs.
"International Search Report and Written Opinion", Application No. PCT/US2020/017930, dated May 29, 2020, 14 pgs.
"International Search Report and Written Opinion", Application No. PCT/US2019/063240, dated Feb. 13, 2020, 16 pgs.
"International Search Report and Written Opinion", Application No. PCT/US2019/068265, dated Apr. 29, 2020, 29 pgs.
"Invitation to Pay Additional Fees", Application No. PCT/US2019/051980, dated Jun. 4, 2020, 10 pgs.
"Invitation to Pay Additional Fees", Application No. PCT/US2019/068265, dated Mar. 13, 2020, 13 pgs.
"LTE; Evolved Universal Terrestrial Radio Access (E-UTRA) and Evolved Universal Terrestrial Radio Access Network (E-UTRAN); Overall Description; Stage 2 (3GPP TS 36.300 version 15.3.0 Release 15)", ETSI TS 136 300 V15.3.0, Oct. 2018, 366 pgs.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pgs.
"Non-Final Office Action", U.S. Appl. No. 16/210,969, dated Jul. 23, 2020, 15 Pgs.
"Non-Final Office Action", U.S. Appl. No. 16/206,579, dated Apr. 10, 2020, 23 Pgs.
"Non-Final Office Action", U.S. Appl. No. 16/419,854, dated Jun. 30, 2020, 29 Pgs.
"Notice of Allowance", U.S. Appl. No. 16/206,579, dated Jul. 8, 2020, 10 Pgs.
"Notice of Allowance", U.S. Appl. No. 16/419,854, dated Nov. 5, 2020, 11 pgs.
"On the Need for More Flexible Configurations Related to CSI Reporting", 3GPP TSG RAN WG1 Meeting #87, R1-161123, Nov. 2016, 6 pgs.
"Supplemental Notice of Allowance", U.S. Appl. No. 16/206,579, dated Sep. 30, 2020, 3 pgs.
"Third Generation Partnership Project; Technical Specification Group Services and System Aspects; Service requirements for the 5G system; Stage 1", 3GPP TS 22.261 version 16.10.0 Release 16, Dec. 2019, 72 pgs.
"U.S. Appl. No. 62/785,949", filed Feb. 21, 2019.
"U.S. Appl. No. 62/785,949", filed Dec. 28, 2018.
"UE Overheating for EN-DC", 3GPP R2-1802414, UE overheating for EN-DC, in 3GPP TSG-RAN WG2 Meeting #101, Apple Inc., Mar. 2, 2018, 3 pgs.
"Universal Mobile Telecommunications System (UMTS); Automatic Neighbour Relation (ANR) for UTRAN", 3GPP TS 25.484 version 10.0.1 Release 10, Jan. 2012, 21 pgs.
"Universal Mobile Telecommunications System (UMTS); Automatic Neighbour Relation (ANR) for UTRAN", 3GPP TS 25.484 version 11.0.0 Release 11, Jan. 2012, 22 pgs.
"Written Opinion", Application No. PCT/US2019/063240, dated Oct. 27, 2020, 10 pgs.
"Written Opinion", Application No. PCT/US2019/068265, dated Sep. 25, 2020, 20 pgs.
"Written Opinion", Application No. PCT/US2020/014638, dated Nov. 26, 2020, 5 pgs.
"Written Opinion", Application No. PCT/US2020/031716, dated Mar. 25, 2021, 6 pgs.
"Written Opinion", Application No. PCT/US2020/031716, dated Aug. 20, 2021, 6 pgs.
"Written Opinion", Application No. PCT/US2019/069129, dated Dec. 14, 2020, 7 pgs.
Aboba, B. et al., "Extensible Authentication Protocol (EAP)", RFC Editor; Retrieved from https://www.rfc-editor.org/info/rfc3748, Jun. 2004, 67 pgs.
Fodor, Gabor et al., "Design Aspects of Network Assisted Device-to-Device Communications", IEEE Communications Magazine, May 2011, 9 pgs.
Gorcin, Ali et al., "Hybrid Automatic Neighbor Relations for 5G Wireless Networks", 2017, 6 pgs.
Klingenbrunn, Thomas et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pgs.
Lin, Roy et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pgs.
Son, Harrison J. "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pgs.
Tavanpour, Misagh "Upload User Collaboration in the Data Upload for LTE-Advanced Networks", Carleton University, Ottawa, Ontario,, Jan. 2016, 199 pgs.
Wu, Chih-Hsiang "Handling Overheating in a Wireless-Communication Device", Technical Disclosure Commons; Retrieved from https://www.tdcommons.org/dpubs_series/2343, Jul. 12, 2019, 22 pgs.
Zhang, Jinfang et al., "PoC of SCMA-Based Uplink Grant-Free Transmission in UCNC for 5G", IEEE Journal on Selected Areas in Communications, vol. 35, No. 6, Jun. 2017, 10 pgs.
Zhang, Jinyu et al., "Grant-less Uplink Transmission for LTE Operated in Unlicensed Spectrum", Feb. 14, 2018, 6 pgs.
"Foreign Office Action", IN Application No. 202247001696, dated Oct. 21, 2022, 6 pages.

(56) References Cited

OTHER PUBLICATIONS

"Notice of Allowance", U.S. Appl. No. 16/963,623, dated Oct. 31, 2022, 6 pages.
"Final Office Action", EP Application No. 19783187.8, dated Jan. 27, 2023, 4 pages.
"Foreign Office Action", EP Application No. 19827946.5, dated Feb. 24, 2023, 7 pages.
"Notice of Allowance", U.S. Appl. No. 16/969,105, dated Feb. 1, 2023, 7 pages.
"Notice of Allowance", U.S. Appl. No. 16/963,623, dated Feb. 22, 2023, 5 pages.
"Foreign Office Action", IN Application No. 202147051065, dated Mar. 28, 2022, 8 pages.
"Foreign Office Action", IN Application No. 202147041653, dated Apr. 26, 2022, 6 pages.
"International Preliminary Report on Patentability", Application No. PCT/US2019/052005, dated Mar. 31, 2022, 8 pages.
"Non-Final Office Action", U.S. Appl. No. 16/969,105, dated Apr. 29, 2022, 8 pages.
"Foreign Office Action", EP Application No. 19756050.1, dated Jan. 24, 2022, 4 pages.
"Foreign Office Action", KR Application No. 10-2020-7022366, dated Feb. 23, 2022, 11 pages.
"Foreign Office Action", IN Application No. 202147031380, dated Mar. 8, 2022, 8 pages.
"Foreign Office Action", IN Application No. 202147025618, dated Mar. 11, 2022, 5 pages.
"International Preliminary Report on Patentability", Application No. PCT/US2019/043355, dated Jan. 25, 2022, 7 pages.
"Non-Final Office Action", U.S. Appl. No. 16/963,623, dated Jan. 5, 2022, 12 pages.
"Notice of Allowance", U.S. Appl. No. 16/969,105, dated Feb. 7, 2022, 7 pages.
"Final Office Action", U.S. Appl. No. 16/969,105, dated Oct. 11, 2022, 9 pages.
"Foreign Office Action", CA Application No. 3,127,384, dated Sep. 27, 2022, 4 pages.
"Notice of Allowance", U.S. Appl. No. 16/963,623, dated Jul. 25, 2022, 8 pages.
"Foreign Office Action", EP Application No. 19842524.1, dated May 11, 2023, 22 pages.
"Notice of Allowance", U.S. Appl. No. 17/287,898, dated Jun. 26, 2023, 12 pages.
"Foreign Office Action", CN Application No. 201980082695.3, dated Aug. 31, 2023, 25 pages.
"Foreign Office Action", TW Application No. 111132535, dated Oct. 20, 2023, 8 pages.
"Non-Final Office Action", U.S. Appl. No. 17/311,996, dated Sep. 28, 2023, 8 pages.
"Non-Final Office Action", U.S. Appl. No. 17/423,836, dated Oct. 5, 2023, 9 pages.
"Notice of Allowance", U.S. Appl. No. 17/433,197, dated Oct. 19, 2023, 10 pages.
Trendafilov, et al., "Model of Coordination Flow in Remote Collaborative Interactions", Mar. 2015, 8 pages.
"Coordinated Multi-Point Transmission—Exploring Possible System Operations and UE Support", TSG-RAN WG1 #55—R1-084407, Nov. 10, 2008, 5 pages.
"Final Office Action", U.S. Appl. No. 17/311,996, filed Feb. 20, 2024, 9 pages.
"Foreign Office Action", CN Application No. 201980082695.3, dated Jan. 20, 2024, 8 pages.
"Foreign Office Action", CN Application No. 201980012509.9, dated Feb. 8, 2024, 28 pages.
"Foreign Office Action", CN Application No. 202080010100.6, dated Dec. 1, 2023, 10 pages.

* cited by examiner

700 ⟶

702
Specify, by a base station, a set of multiple user equipment to form a disengaged-mode-user-equipment coordination set for joint transmission and reception of data intended for one or more of the multiple user equipment

↓

704
Select one of the multiple user equipment within the disengaged-mode-user-equipment coordination set to act as a coordinating UE for the disengaged-mode-user-equipment coordination set

↓

706
Transmit a request message that directs the coordinating UE to coordinate the joint transmission and reception of the data intended for the one or more of the multiple user equipment

↓

708
Transmit a downlink signal to each user equipment within the disengaged-mode-user-equipment coordination set that is effective to enable each user equipment within the disengaged-mode-user-equipment coordination set to: demodulate and sample the downlink signal and forward the samples to the coordinating user equipment; and enable the coordinating user equipment to: combine the samples from each user equipment and jointly process the combined samples to provide decoded data

*Fig. 7*

USER-EQUIPMENT-COORDINATION SET FOR DISENGAGED MODE

RELATED APPLICATION(S)

This application is a national stage entry of International Application No. PCT/US2020/031716, filed May 6, 2020, which in turn claims priority to U.S. Utility application Ser. No. 16/419,854, filed May 22, 2019, the disclosures of which are incorporated herein by reference in their entireties.

Background

Generally, a provider of a wireless network manages wireless communications over the wireless network. For example, a base station manages a wireless connection with a user equipment (UE) that is connected to the wireless network. The base station determines configurations for the wireless connection, such as bandwidth, timing, and protocol for the wireless connection.

The quality of service between the UE and the base station can be degraded by a number of factors, such as loss in signal strength, bandwidth limitations, interfering signals, and so forth. This is particularly true for UEs operating at a cell edge, which is frequently troubled by weak signal quality. A number of solutions have been developed to address cell-edge issues occurring in certain wireless communication systems. However, with recent advancements in wireless communication systems, such as increased data transmission speeds associated with Fifth Generation New Radio (5G NR), at least some of those previous solutions have become less efficient, especially when a user equipment is in a disengaged mode, such as an idle mode or an inactive mode.

SUMMARY

This summary is provided to introduce simplified concepts of a UE-coordination set for disengaged mode. The simplified concepts are further described below in the Detailed Description. This summary is not intended to identify essential features of the claimed subject matter, nor is it intended for use in determining the scope of the claimed subject matter.

In some aspects, a method for using a disengaged-mode-user-equipment coordination set by a base station is described in which the base station specifies a set of multiple user equipment to form the disengaged-mode-user-equipment coordination set, for joint transmission and reception of data intended for one or more of the multiple user equipment included in the disengaged-mode-user-equipment coordination set, each of the multiple user equipment being in a disengaged mode. The base station selects one of the multiple user equipment within the disengaged-mode-user-equipment coordination set to act as a coordinating UE for the disengaged-mode-user-equipment coordination set. The base station transmits a request message that directs the coordinating user equipment to coordinate the joint transmission and reception of the data intended for the one or more of multiple user equipment. The base station transmits a downlink signal to each user equipment within the disengaged-mode-user-equipment coordination set effective to: i) enable each user equipment within the disengaged-mode-user-equipment coordination set to: demodulate and sample the downlink signal, and forward the samples to the coordinating user equipment; and ii) enable the coordinating user equipment to: combine the samples from each user equipment, and jointly process the combined samples to provide decoded data.

In another aspect, a method performed by a user equipment in a wireless communications network is described in which the user equipment receives an indication to transition to a disengaged mode. The user equipment receives a request message from a base station directing the user equipment to join a disengaged-mode-user-equipment coordination set which includes multiple user equipment in the disengaged mode. The user equipment transitions to the disengaged mode. The user equipment receives baseband samples from at least one of the multiple user equipment in the disengaged-mode-user-equipment coordination set, the baseband samples corresponding to data intended for one or more of the multiple user equipment included in the disengaged-mode-user-equipment coordination set and received by the at least one user equipment in the disengaged-mode-user-equipment coordination set. The user equipment aggregates the baseband samples to provide a combined baseband signal, jointly processes the combined baseband signal to decode the data intended for the one or more of the multiple user equipment, and, based on the decoded data, forwards the data corresponding to the aggregated information to the one or more of the multiple user equipment.

BRIEF DESCRIPTION OF THE DRAWINGS

The details of one or more aspects of a UE-coordination set for disengaged mode are described below. The use of the same reference numbers in different instances in the description and the figures indicate similar elements:

FIG. 7 illustrates an example method of a UE-coordination set for disengaged mode as generally related to the base station in accordance with aspects of the techniques described herein.

DETAILED DESCRIPTION

Figure 1:
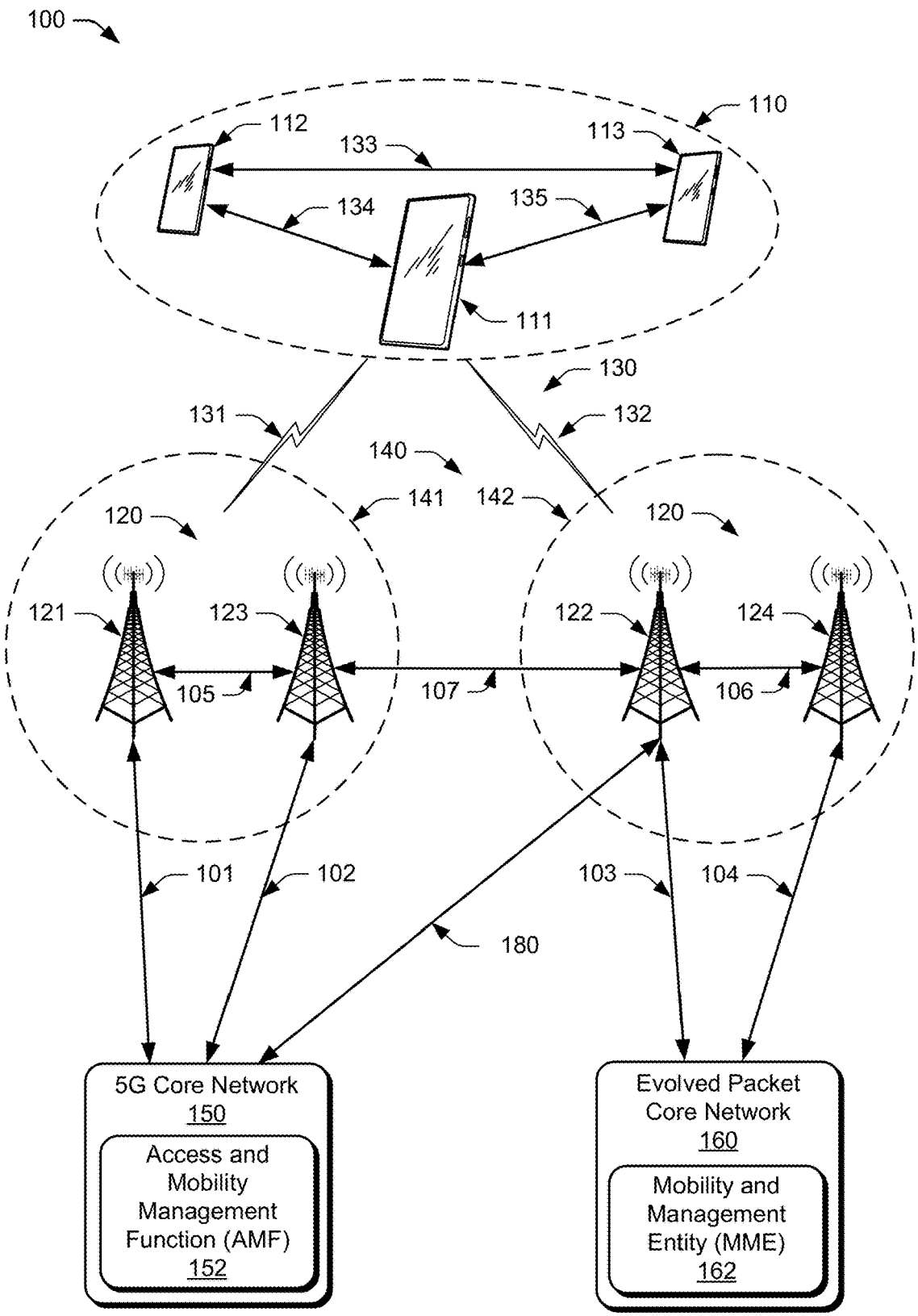
FIG. 1 illustrates an example operating environment in which aspects of a UE-coordination set for disengaged mode can be implemented.

In conventional wireless communication systems, a signal quality between a user equipment (UE) and a base station can be degraded by a number of factors, such as signal interference or distance between the UE and the base station, resulting in slower and less efficient data transmission. This degradation of the signal quality is common for a UE located near the cell edge of the base station.

This document describes techniques and apparatuses for a UE-coordination set for disengaged mode which facilitates more efficient data transmission for a user equipment in a disengaged mode in comparison to conventional wireless communication systems. A UE-coordination set is formed by multiple UEs assigned as a group to function together, similar to a distributed antenna, for the benefit of a particular UE. The UE-coordination set includes a coordinating UE that coordinates joint transmission and reception of downlink and/or uplink data for the particular UE (e.g., target UE) or multiple UEs in the UE-coordination set. By combining antennas and transmitters of multiple UEs in the UE-coordination set, the effective transmission power of the particular UE is significantly increased, and the effective signal quality is greatly improved. A base station can form UE-coordination sets based on the resource control state of various groups of user equipment. For example, a base station can form a UE-coordination set for multiple UEs in an engaged mode (e.g., a connected mode) that are actively communicating data with the base station. Additionally or alternatively, the base station can form a disengaged-mode-user-equipment coordination set for multiple UEs in a disengaged mode (e.g., an idle mode or an inactive mode) that are not actively communicating data with the base station.

Multiple UEs can each receive downlink data transmissions from the base station. These UEs may not decode the downlink transmissions into data packets and then forward the data packets to a destination, as in conventional relay techniques. Rather, the UEs determine where to forward raw I/Q samples of the downlink transmissions, such as to a coordinating UE or a target UE. In aspects, the target UE may include a subset of target UEs within the UE-coordination set. The coordinating UE (or the target UE) receives the raw I/Q samples from the other UEs in the UE-coordination set and stores the I/Q samples in a buffer memory. Then, the coordinating UE (or the target UE) synchronizes and decodes the stored raw I/Q samples into data packets for the target UE(s). Accordingly, the processing of the raw I/Q samples occurs at the coordinating UE or the target UE. In this way, the UE-coordination set acts as a distributed antenna for the target UE. The target UE includes its own antenna(s) and participates in the collecting of data in the I/Q format from the base station and forwarding the raw I/Q data to the coordinating UE. If the target UE is the coordinating UE, however, then the target UE does not forward the raw I/Q samples to itself.

In one use case, multiple UEs carried by a group of hikers in a low radio coverage area can form a UE-coordination set to transmit a message to a base station at a higher effective transmit power than would be possible for an individual UE in that area. Additionally, those UEs can form a UE-coordination set to receive a message from the base station for one of the UEs at a higher effective receive power than would be possible for that one UE to individually receive. One of the multiple UEs acts as a coordinating UE for the UE-coordination group to aggregate data signals intended for a target UE and received by the UE-coordination group. Each of the UEs demodulates and samples the radio frequency signals and forwards the baseband samples to the coordinating UE using a local wireless network or a personal area network, such as Bluetooth™ Then, the coordinating UE aggregates and process the samples to generate decoded data and provide the decoded data to the target UE. Alternatively, the coordinating UE can forward the stored samples to the target UE to allow the target UE to demodulate the data.

In another use case, a single user may have a work smartphone and a personal smartphone. In some cases, both the work smartphone and the personal smartphone may be located in a basement home-office with low cellular coverage. The work smartphone and the personal smartphone can form a UE-coordination set to transmit messages to, or receive messages from, a base station at a higher effective transmit or receive power than either smartphone is capable of individually. The work smartphone and the personal smartphone may also form a UE-coordination set with one or more other devices (e.g., tablet, smart appliance, Internet-of-things device) in the home to further increase the effective transmit and/or receive power of the work smartphone or the personal smartphone.

In aspects, a base station forms a disengaged-mode-user-equipment coordination set including multiple UEs in the disengaged mode. The disengaged-mode-user-equipment coordination set uses joint transmission and reception to improve effective transmission power and reception quality for UEs in the disengaged-mode-user-equipment coordination set, as compared to transmission power and reception quality of a single UE.

In aspects, the base station communicates control-plane information to an individual UE or multiple UEs in the disengaged-mode-user-equipment coordination set. The base station can communicate system information updates to the UEs in the disengaged-mode-user-equipment coordination set or transmit a paging indication for a single UE (target UE) in the disengaged-mode-user-equipment coordination set.

In other aspects, the base station determines a common configuration for discontinuous reception (DRX) by the UEs in the disengaged-mode-user-equipment coordination set. Optionally or additionally, the base station receives UE capability information from the UEs in the disengaged-mode-user-equipment coordination set and can use the UE capability information and/or other status information about the UEs to determine parameters of the DRX configuration. The base station communicates the DRX communication parameters to the disengaged-mode-user-equipment coordination set which causes the UEs to synchronize in order to use joint reception for discontinuous reception.

In a further aspect, the base station specifies cell reselection parameters specific to a disengaged-mode-user-equipment coordination set. The base station determines a reception metric for the disengaged-mode-user-equipment coordination set, such as a signal-to-noise ratio (SNR) for joint reception and communicates the reception metric to the disengaged-mode-user-equipment coordination set. If the UEs in the disengaged-mode-user-equipment coordination set measure the reception metric, and the measurement is below a threshold value for the reception metric, the disengaged-mode-user-equipment coordination set performs a cell reselection procedure and selects the base station with the best value for the reception metric at the camped base station for the disengaged-mode-user-equipment coordination set.

In another aspect, the disengaged-mode-user-equipment coordination set transmits a tracking area update. In response to a cell reselection, if the newly selected base station is in a different tracking area than the previously selected base station, the disengaged-mode-user-equipment coordination set, the disengaged-mode-user-equipment coordination set jointly transmits a tracking area update.

Example Environments

FIG. 1 illustrates an example environment 100, which includes multiple user equipment 110 (UE 110), illustrated as UE 111, UE 112, and UE 113. Each UE 110 can communicate with one or more base stations 120 (illustrated as base stations 121, 122, 123, and 124) through one or more wireless communication links 130 (wireless link 130), illustrated as wireless links 131 and 132. Each UE 110 in a UE-coordination set can communicate with a coordinating UE of the UE-coordination set and/or a target UE in the UE-coordination set through one or more local wireless network connections (e.g., personal area network, near-field communication (NFC), Bluetooth™, ZigBee™) such as local wireless network connections 133, 134, and 135. In this example, the UE 110 is implemented as a smartphone. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless link 131 and 132 can include a downlink of data and control information communicated from the base stations 120 to the UE 110, an uplink of other data and control information communicated from the UE 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110. Additionally, multiple wireless links 130 may be configured for single-RAT dual connectivity or multi-RAT dual connectivity (MR-DC). Each of these various multiple-link situations tends to increase the power consumption of the UE 110.

The base stations 120 are collectively a Radio Access Network 140 (RAN, Evolved Universal Terrestrial Radio Access Network, E-UTRAN, 5G NR RAN or NR RAN). The RANs 140 are illustrated as a NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 101 and 102 respectively, to the 5GC 150 using an NG2 interface for control-plane signaling and using an NG3 interface for user-plane data communications. The base stations 122 and 124 connect, at 103 and 104 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using the NG2 interface for control-plane signaling and using the NG3 interface for user-plane data communications, at 180.

In addition to connections to core networks, base stations 120 may communicate with each other. The base stations 121 and 123 communicate using an Xn interface at 105. The base stations 122 and 124 communicate using an X2 interface at 106. At least one base station 120 (base station 121 and/or base station 123) in the NR RAN 141 can communicate with at least one base station 120 (base station 122 and/or base station 124) in the E-UTRAN 142 using an Xn interface 107. In aspects, base stations 120 in different RANs (e.g., master base stations 120 of each RAN) communicate with one another using an Xn interface such as Xn interface 107.

The 5GC 150 includes an Access and Mobility Management Function 152 (AMF 152) that provides control-plane functions such as registration and authentication of multiple UE 110, authorization, mobility management, or the like in the 5G NR network. The EPC 160 includes a Mobility Management Entity 162 (MME 162) that provides control-plane functions such as registration and authentication of multiple UE 110, authorization, mobility management, or the like in the E-UTRA network. The AMF 152 and the MME 162 communicate with the base stations 120 in the RANs 140 and also communicate with multiple UE 110 using the base stations 120.

Example Devices

Figure 2:
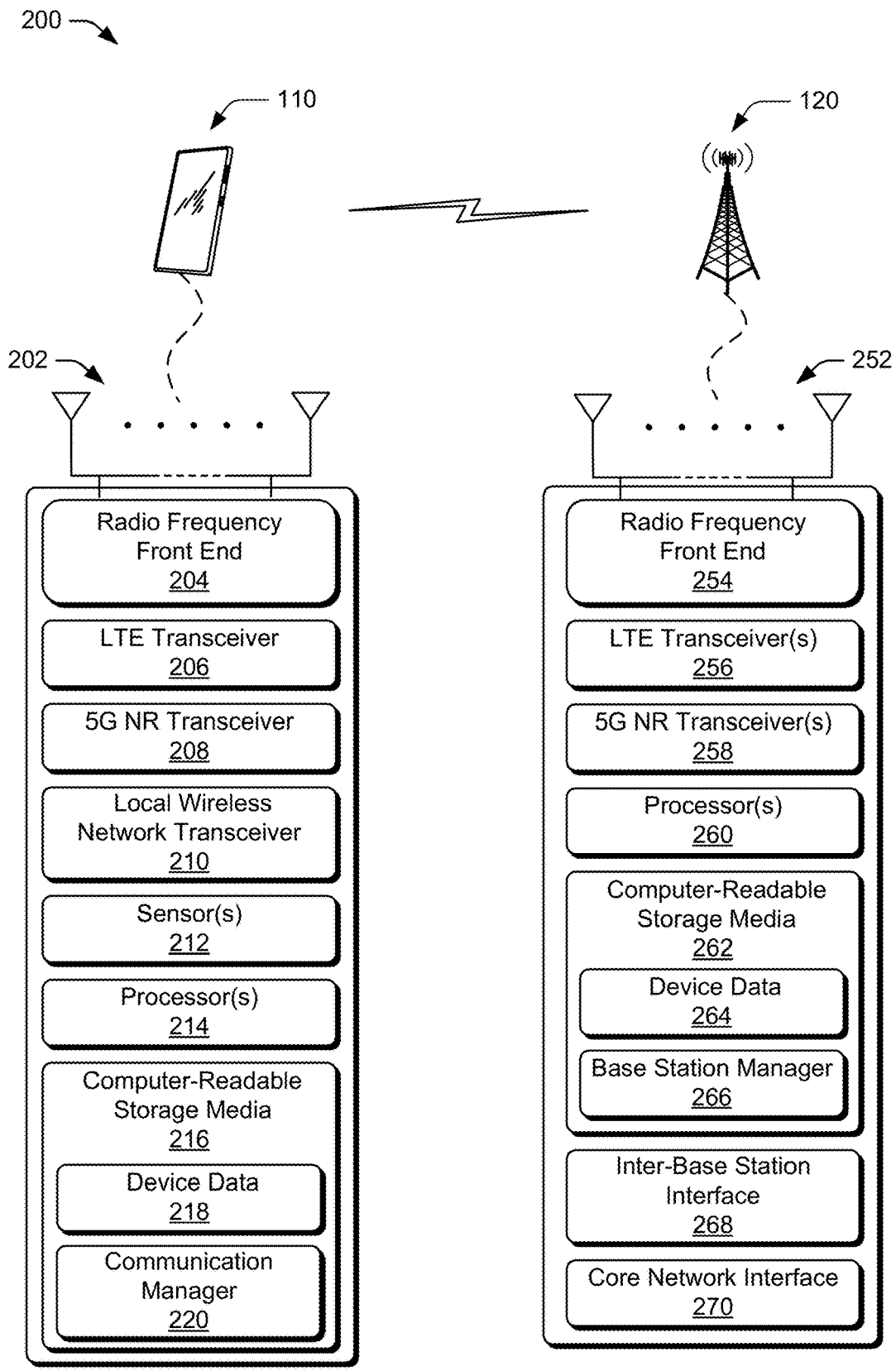
FIG. 2 illustrates an example device diagram of a user equipment and a serving cell base station.

FIG. 2 illustrates an example device diagram 200 of a user equipment and a base station. In aspects, the device diagram 200 describes devices that can implement various aspects of a UE-coordination set for disengaged mode. Included in FIG. 2 are the multiple UE 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), and radio-frequency transceivers (e.g., an LTE transceiver 206 and a 5G NR transceiver 208) for communicating with base stations 120 in the 5G RAN 141 and/or the E-UTRAN 142. The UE 110 includes one or more additional transceivers (e.g., local wireless network transceiver 210) for communicating over one or more wireless local wireless networks (e.g., WLAN, Bluetooth, NFC, a personal area network (PAN), WiFi-Direct, IEEE 802.15.4, ZigBee, Thread, mmWave) with at least the coordinating UE, and/or the target UE, of the UE-coordination set. The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. In addition, the RF front end 204 can be tuned to, and/or be tunable to, one or more frequency bands defined and implemented by the local wireless network transceiver 210 to support transmission and reception of communications with other UEs in the UE-coordination set over a local wireless network.

The UE 110 includes sensor(s) 212 can be implemented to detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor composed of a variety of materials, such as silicon, poly-silicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

CRM 216 also includes a communication manager 220. Alternately or additionally, the communication manager 220 may be implemented in whole or part as hardware logic or circuitry integrated with or separate from other components of the UE 110. In at least some aspects, the communication manager 220 configures the RF front end 204, the LTE transceiver 206, the 5G NR transceiver 208, and/or the local wireless network transceiver 210 to implement the techniques described herein for a UE-coordination set for disengaged mode.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

Network Stack

Figure 3:
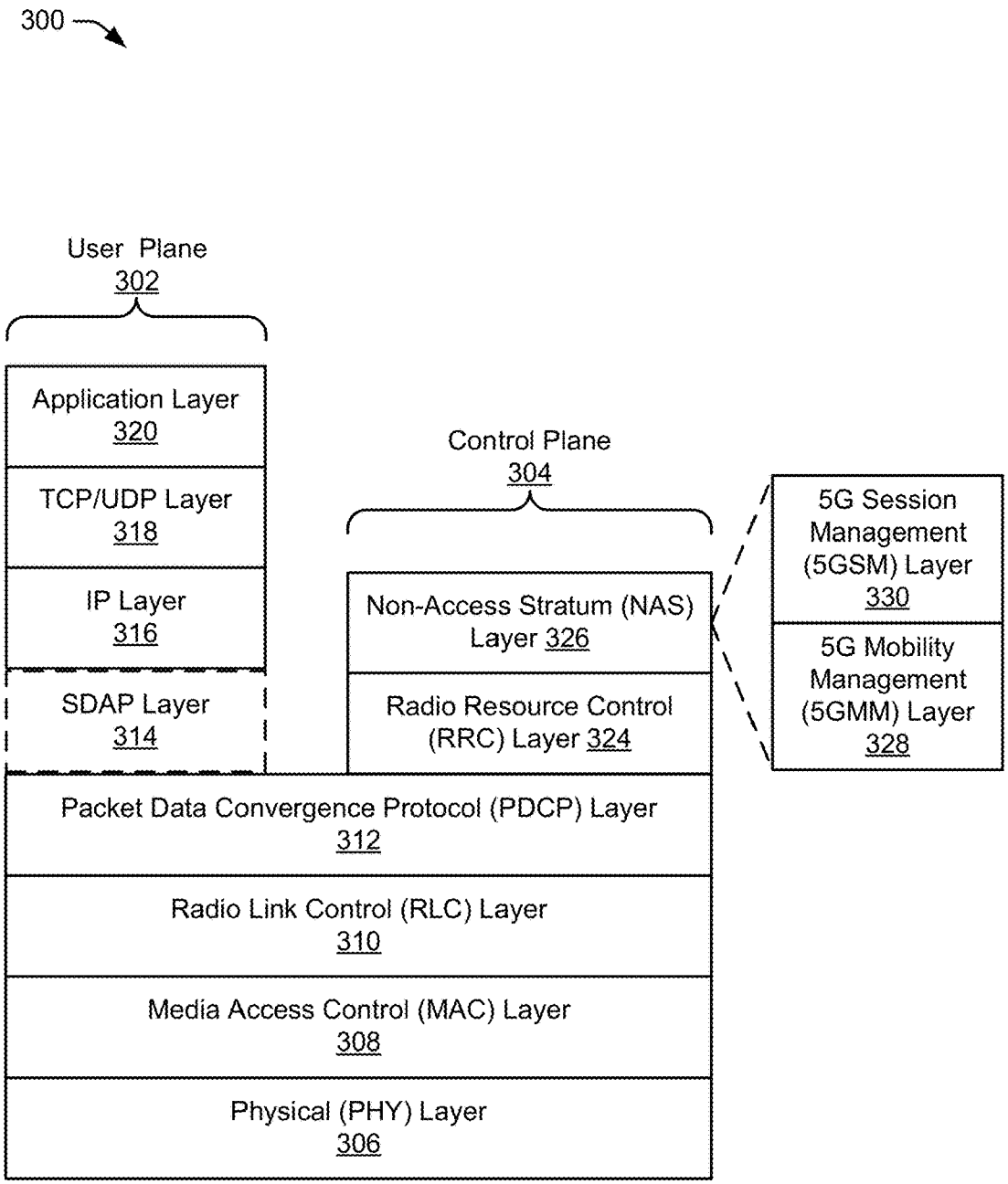
FIG. 3 illustrates an example block diagram of a wireless network stack model in which various aspects of a UE-coordination set for disengaged mode can be implemented.

FIG. 3 illustrates an example block diagram 300 of a wireless network stack model 300 (stack 300). The stack 300 characterizes a communication system for the example environment 100, in which various aspects of a UE-coordination set for disengaged mode can be implemented. The stack 300 includes a user plane 302 and a control plane 304. Upper layers of the user plane 302 and the control plane 304 share common lower layers in the stack 300. Wireless devices, such as the UE 110 or the base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical (PHY) layer 306, a Media Access Control (MAC) layer 308, a Radio Link Control (RLC) layer 310, and a PDCP layer 312. The PHY layer 306 provides hardware specifications for devices that communicate with each other. As such, the PHY layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the stack 300. Generally, the PDCP layer 312 provides transfer of user plane 302 and control plane 304 data, header compression, ciphering, and integrity protection.

Above the PDCP layer 312, the stack splits into the user-plane 302 and the control-plane 304. Layers of the user plane 302 include an optional Service Data Adaptation Protocol (SDAP) layer 314, an Internet Protocol (IP) layer 316, a Transmission Control Protocol/User Datagram Protocol (TCP/UDP) layer 318, and an application layer 320, which transfers data using the wireless link 106. The optional SDAP layer 314 is present in 5G NR networks. The SDAP layer 314 maps a Quality of Service (QoS) flow for each data radio bearer and marks QoS flow identifiers in uplink and downlink data packets for each packet data session. The IP layer 316 specifies how the data from the application layer 320 is transferred to a destination node. The TCP/UDP layer 318 is used to verify that data packets intended to be transferred to the destination node reached the destination node, using either TCP or UDP for data transfers by the application layer 320. In some implementations, the user plane 302 may also include a data services layer (not shown) that provides data transport services to transport application data, such as IP packets including web browsing content, video content, image content, audio content, or social media content.

The control plane 304 includes a Radio Resource Control (RRC) layer 324 and a Non-Access Stratum (NAS) layer 326. The RRC layer 324 establishes and releases connections and radio bearers, broadcasts system information, or performs power control. The RRC layer 324 also controls a resource control state of the UE 110 and causes the UE 110 to perform operations according to the resource control state. Example resource control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 324 supports 3GPP access but does not support non-3GPP access (e.g., WLAN communications).

The NAS layer 326 provides support for mobility management (e.g., using a Fifth-Generation Mobility Management (5GMM) layer 328) and packet data bearer contexts (e.g., using a Fifth-Generation Session Management (5GSM) layer 330) between the UE 110 and entities or functions in the core network, such as the Access and Mobility Management Function 152 (AMF 152) of the 5GC 150 or the like. The NAS layer 326 supports both 3GPP access and non-3GPP access.

In the UE 110, each layer in both the user plane 302 and the control plane 304 of the stack 300 interacts with a corresponding peer layer or entity in the base station 120, a core network entity or function, and/or a remote service, to support user applications and control operation of the UE 110 in the RAN 140.

UE-Coordination Set

Figure 4:
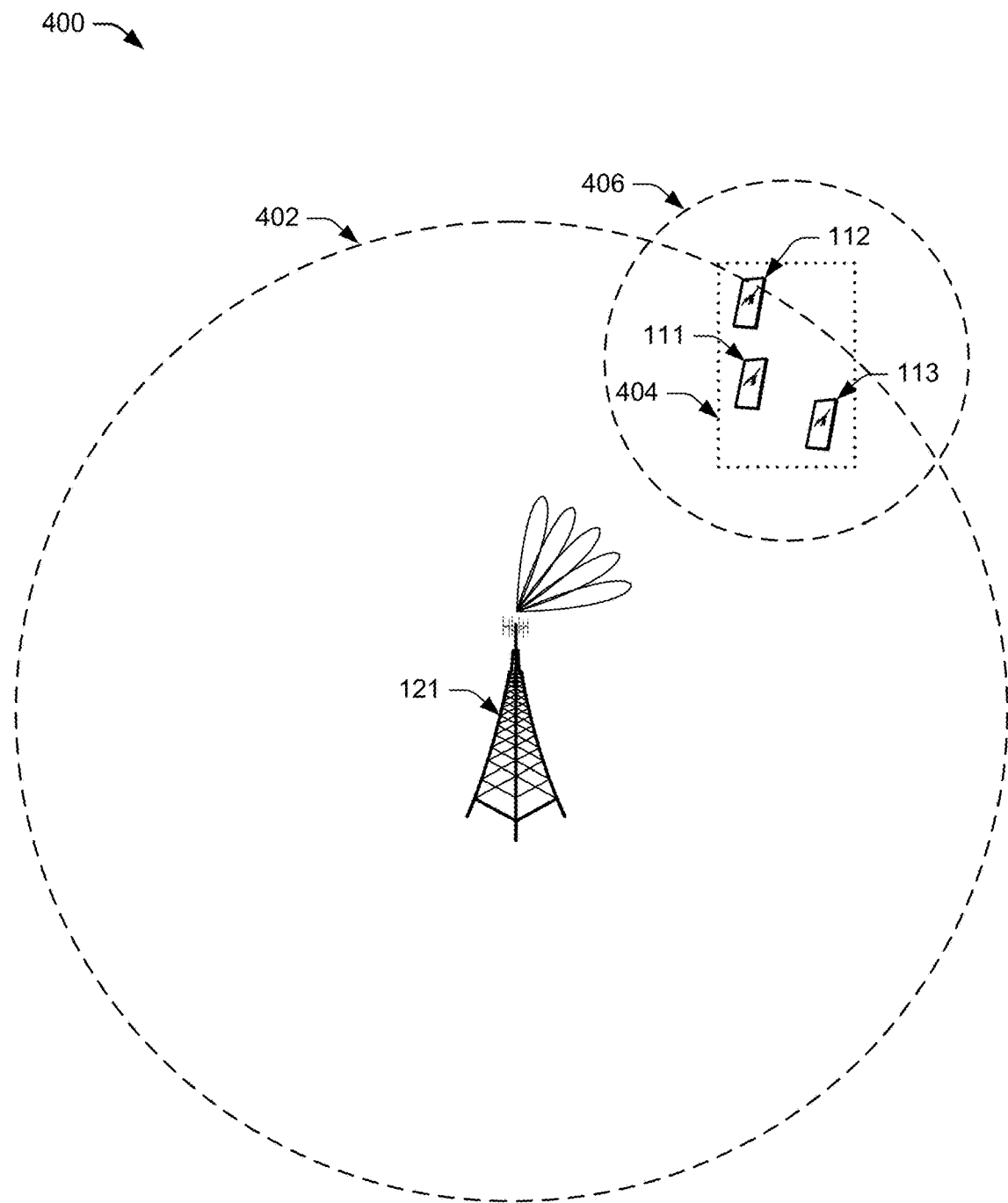
FIG. 4 illustrates an example environment in which various aspects of a UE-coordination set for disengaged mode can be implemented.

FIG. 4 illustrates an example implementation 400 of a UE-coordination set for disengaged mode. The illustrated example includes a base station 121, UE 111, UE 112, and UE 113. In an example, each of the UEs illustrated in FIG. 4 may have limited transmission power, which may cause difficulties in transmitting data to the base station 121. This may be due, at least partially, to the UEs being proximate to a cell edge 402 of the base station 121 or the UEs being in a transmission-challenged location (e.g., a basement, urban canyon, etc.) that has a poor link budget. Each of the UEs illustrated in FIG. 4 may also, or alternatively, have limited reception power, which may be affected by cell-edge transmission power of the base station 121, as well as multipath, signal interference from other transmitters or overhead electrical wires, attenuation from weather or objects such as buildings, trees, etc.

Using the techniques described herein, the base station 121 can specify a set of UEs (e.g., the UE 111, UE 112, and UE 113) to form a UE-coordination set (e.g., the UE-coordination set 404) for joint transmission and joint reception of data for a target UE (e.g., the UE 112). The base station 121 may determine, based on information corresponding to the UEs (e.g., UE location, signal level, battery level, and so on), whether coordination is beneficial for a particular UE or not. Based on a user input or predefined setting, each of the UEs may opt in or out of participation in the UE-coordination set. An effective transmit power of the target UE 112 can increase significantly (e.g., linearly) with the number of UEs in the UE-coordination set, which can greatly improve a link budget of the target UE 112. The base station 121 may determine a UE-coordination set based on various factors, such as a location of each UE relative to the base station 121, distance between the UEs (such as between each other, between each UE and the target UE, or between each UE and a coordinating UE of the UE-coordination set) or a combination thereof. In some aspects, UEs within a certain distance of each other can more easily coordinate with one another to reduce signal interference when in close proximity by using a local wireless network.

In addition, UE coordination can be based on spatial beams or timing advance, or both, associated with each UE. For example, for beamforming or Massive-MIMO, it may be desirable that all the UEs within the UE-coordination set are able to receive the same signal from the base station. Therefore, all the UEs within the UE-coordination set may be geographically near one another, e.g., within a threshold distance of a particular UE in the UE-coordination set. In this way, the UEs in the UE-coordination set may each be in the same beam or beams that are close to each other. Timing advance may indicate a distance between a UE and the base station. A similar timing advance for each UE in a group indicates that those UEs are approximately the same distance from the base station. UEs within a predefined distance of one another that are all a similar distance from the base station may be capable of working together in a UE-coordination set in a distributed fashion to improve a signal strength and quality of a single UE in the UE-coordination set.

The base station can send layer-2 messages (e.g., Media Access Control layer) and/or layer-3 (e.g., Service Data Adaptation Protocol layer) messages to UEs to direct or request those UEs to join the UE-coordination set. The base station can provide additional data to the UEs within the UE-coordination set to enable the UEs to communicate with at least the coordinating UE or the target UE. The additional data may include an identity of the coordinating UE and/or an identity of the target UE, security information, and/or local wireless network information.

The base station can receive a response message from a UE in the UE-coordination set acknowledging the request message. In some cases, the base station can receive a response message from at least two of the UEs acknowledging that a UE has joined the UE-coordination set. The response message may indicate that the request message has been approved by a user of the UE.

In addition, the base station can identify and command (or request) a specific UE within the UE-coordination set to act as a coordinating UE (e.g., master UE) for the UE-coordination set. For example, the base station 121 can transmit a configuration message (e.g., request message) to the specific UE to request that the specific UE act as the coordinating UE for the UE-coordination set. The specific UE may accept or decline the request based on user input from a user of the UE or a setting that is set to automatically accept or decline such requests. In some aspects, the UE may transmit a UE-capability message or other layer-3 message as a response to the request message from the base station 121. The coordinating UE can coordinate the messages and samples sent between UEs within the UE-coordination set for joint transmission and joint reception. In aspects, the coordinating UE can determine where the joint processing is to occur, e.g., at the coordinating UE or the target UE. In an example, the coordinating UE can coordinate how a particular UE in the UE-coordination set is to send I/Q samples, which the particular UE receives from the base station, to the target UE.

The base station can select the coordinating UE from the group of UEs in the UE-coordination set based on a variety of factors, some of which may be signaled to the base station by the UE using a UE-capability message. One example factor includes processing power of the coordinating UE, which provides the coordinating UE the capability to handle certain aspects of the UE-coordination set including central coordination or scheduling. Another factor may include a battery-level state of the coordinating UE. For instance, if a particular UE in the UE-coordination set has a low battery, then that UE may not be a good candidate to act as the coordinating UE. Accordingly, UEs within the UE-coordination set that have a battery-level state above a threshold value may be considered as candidates for selection as the coordinating UE. In one example, the base station may first select one UE as a coordinating UE, and receive, subsequent to formation of the UE-coordination set, messages from the other UEs in the UE-coordination set indicating respective battery-level states. Then, the base station can change the coordination UE if another UE in the UE-coordination set would be a better candidate based on the battery-level states of the UEs in the UE-coordination set.

Yet another factor may include a location of the coordinating UE. The base station may identify the location of the UEs in the UE-coordination set based on various factors, such as angle of arrival of signals from the UE, timing advance, observed time difference of arrival (OTDOA), and so on. An ideal location for the coordinating UE may be geographically central in the UE-coordination set, as this may maximize the coordinating UE's capability to coordinate and communicate with the other UEs in the UE-coordination set. However, the coordinating UE is not required to be in a central location of the UEs in the UE-coordination set. Rather, the coordinating UE can be located at any location within the UE-coordination set that allows the coordinating UE to communicate and coordinate with the other UEs in the UE-coordination set. The base station constantly monitors the UE-coordination set and can update the coordinating UE at any time based on updated factors, such as updated UE locations, UE battery-level state, and so on. Or, as mentioned previously, the coordinating UE may transfer its joint processing responsibilities to another UE based on factors such as processing power, battery level, and/or geographic location.

In some aspects, the base station can receive indications from one or more UEs in the UE-coordination set that advertise their capability to act as the coordinating UE. Additionally or alternatively, the base station can receive indications from one or more UEs in the UE-coordination set that indicate a willingness of a user of a respective UE to allow their UE to participate in the UE-coordination set and/or act as the coordinating UE. Accordingly, a UE in the UE-coordination set can indicate, using a layer-3 message, to the base station whether it is capable of acting and/or permitted to act as the coordinating UE.

In the illustrated example 400 in FIG. 4, the base station 121 may select UE 111 to act as the coordinating UE since the UE 111 is located between UE 112 and UE 113 or because the UE 111 is capable of communicating with each of the other UEs 112 and 113 in the UE-coordination set. The base station 121 may select the coordinating UE for various reasons, examples of which are described above. Being at the cell edge, all three of the UEs 111, 112, 113 have a weak cellular reception (and transmission) power. The base station 121 selects UE 111 to coordinate messages and samples sent between the base station 121 and the UEs 111, 112, 113 for the target UE 112. Such communication between the UEs can occur using a local wireless network 406, such as a PAN, NFC, Bluetooth, WiFi-Direct, local mmWave link, etc. In this example, all three of the UEs 111, 112, 113 receive RF signals from the base station 121. The UE 112 and the UE 113 demodulate the RF signals to baseband I/Q analog signals, sample the baseband I/Q analog signals to produce I/Q samples, and forward the I/Q samples along with system timing information (e.g., system frame number (SFN)) the local to the coordinating UE 111 using the local wireless network transceiver 210. The coordinating UE 111 then uses the timing information to synchronize and combine the I/Q samples and processes the combined signal to decode data packets for the target UE 112. The coordinating UE 111 then transmits the data packets to the target UE 112 using the local wireless network 406.

When the target UE 112 has uplink data to send to the base station 121, the target UE transmits the uplink data to the coordinating UE 111, which uses the local wireless network 406 to distribute the uplink data to each UE in the UE-coordination set 404. Each UE in the UE-coordination set 404 synchronizes with the base station 121 for timing information and its data transmission resource assignment. Then, all three UEs in the UE-coordination set 404 jointly transmit the uplink data to the base station 121. The base station 121 receives the jointly-transmitted uplink data from the UEs 111, 112, 113 and processes the combined signal to decode the uplink data from the target UE 112.

Joint Transmission and Reception

The UE-coordination set 404 enhances the target UE's ability to transmit data to the base station 121 and receive data from the base station 121 by generally acting as a distributed antenna of the target UE 112. For example, the base station 121 transmits downlink data using RF signals to multiple UEs in the UE-coordination set 404. At least some of the multiple UEs demodulate the received RF signals to an analog baseband signal and sample the baseband signal to produce a set of I/Q samples, which the UEs send to the coordinating UE along with system timing information. The coordinating UE accumulates and stores the I/Q samples from each UE in a memory buffer. Because each of the UEs in the UE-coordination set 404 synchronizes with the base station 121, all of the UEs in the UE-coordination set 404 have a common time, based on a common time base (e.g., system frame number (SFN)), effective to enable the coordinating UE to manage the timing and aligning of the I/Q samples for the accumulation and storage of the I/Q samples in the memory buffer. For joint reception and decoding, the coordinating UE processes the stored I/Q samples to decode the downlink data for the target UE. In aspects, I/Q samples can be processed at multiple UEs (e.g., less than all the UEs in the UE-coordination set), at the target UE 112, or at the coordinating UE 111. At least a subset of the UEs in the UE-coordination set 404 can participate in the accumulation and/or the joint processing of the downlink I/Q samples. In at least one aspect, the coordinating UE 111 can select which UEs in the UE-coordination set 404 are to be included in the subset of UEs that participate in the accumulation and/or the joint processing of the downlink I/Q samples. In other aspects, the base station 121 can make this selection.

Multiple UEs can each receive downlink transmissions from the base station 121. These UEs may not decode the downlink transmissions into data packets and then forward the data packets to a destination, as in conventional relay techniques. Rather, the UEs determine where to forward raw I/Q samples of the downlink transmissions, such as to the coordinating UE 111 or the target UE 112. In aspects, the target UE 112 may include a subset of target UEs within the UE-coordination set 404. The coordinating UE 111 (or the target UE 112) receives the raw I/Q samples from the other UEs in the UE-coordination set 404 and stores the I/Q samples in a buffer memory. Then, the coordinating UE 111 (or the target UE 112) decodes the stored raw I/Q samples into data packets for the target UE(s) 112. Accordingly, the processing of the raw I/Q samples occurs at the coordinating UE 111 or the target UE 112. In this way, the UE-coordination set 404 acts as a distributed antenna for the target UE 112. The target UE 112 includes its own antenna(s) and participates in the collecting of data in the I/Q format from the base station 121 and forwarding the raw I/Q data to the coordinating UE 111.

In one example, a UE-coordination set includes three UEs, each having two antennas. The base station sends a downlink signal for one target UE in the UE-coordination set, where the target UE is acting as the coordinating UE of the UE-coordination set. Typically, the target UE would only have use of its own antennas (in this example, the target UE only has two antennas) to receive the downlink signal. Here, however, all three UEs (each using two antennas) in the UE-coordination set receive the downlink signal and forward the downlink signal to the target UE. In this way, the target UE behaves as if it had six antennas, which significantly enhances the signal strength of the target UE. Each UE in the UE-coordination set does not decode the downlink signal. Rather, each UE in the UE-coordination set may demodulate the downlink signal (e.g., RF signal) to an analog baseband signal and sample the baseband signal to produce I/Q samples. This is because one or more of the UEs may not be able to individually demodulate or decode the signal properly, particularly if they are near the cell edge and/or have a relatively weak signal strength due to interference or channel impairments affecting the link budget. The I/Q samples are forwarded to the coordinating UE, which aggregates and decodes the I/Q samples into downlink data for the target UE. Accordingly, the downlink signals from all the UEs in the UE-coordination set are jointly received to provide an effective signal strength sufficient to demodulate and decode the packet at a single UE.

In aspects, UEs within the same coordination set can jointly receive downlink transmissions from the base station for a subset of UEs in the UE-coordination set, rather than for a single target UE. Each UE in the UE-coordination set can produce raw I/Q samples from the downlink transmissions and forward the raw I/Q samples to the subset of UEs. The UEs within the same coordination set can perform joint or coherent processing for data sent by the base station. Coherent processing refers to the UEs functioning as a receive antenna chain such that the data is coherently combined at the subset of UEs or the coordinating UE. The subset of UEs or the coordinating UE can use the raw I/Q samples to perform the joint processing of the downlink transmissions.

For joint transmission, multiple UEs in the UE-coordination set 404 each use their respective antennas and transmitters to transmit uplink data from the target UE 112 on air interface resources as directed by the base station coordinating the UE-coordination set. In this way, the target UE's uplink data can be processed together and transmitted using the transmitters and the transmission antennas of multiple (including all) UEs in the UE-coordination set 404. In an example, the target UE 112 uses its local wireless network transceiver 210 to transmit uplink data to the coordinating UE 111. The coordinating UE 111 uses its local wireless network transceiver 210 to distribute the data to the other UEs in the UE-coordination set 404. Then, all the UEs in the UE-coordination set 404 process and transmit the uplink data to the base station 121. In this way, the distributed transmission provides for a better effective link budget given the channel impairments encountered by the target UE 112.

In an example, the coordinating UE 111 replicates the same uplink signal across the multiple UEs' transmit antennas, which combines the power from multiple UEs' power amplifiers. Replicating the signal across multiple UEs for joint transmission significantly increases the effective transmit power over any single UE's transmit power. The coordinating UE 111 and the target UE 112 also each transmit a replica of the uplink signal. So, similar to the downlink described above, the additional UEs in the UE-coordination set function as additional antennas for the target UE 112. In aspects, the UEs in the UE-coordination set 404 communicate with each other and with the coordinating UE 111 using the local wireless network 406, such as WLAN.

UEs within the same UE-coordination set 404 can jointly send data packets for the target UE 112 to the base station 121. For example, a subset of UEs in the UE-coordination set 404 can perform joint transmission for the target UE 112 (or a subset of UEs) within the UE-coordination set 404. The target UE 112 can also send its data to the rest of (or to the subset of) the UEs in the UE-coordination set 404 to enable those other UEs to assist in the transmission of the data for the target UE 112 to the base station 121.

User Equipment States

Figure 5:
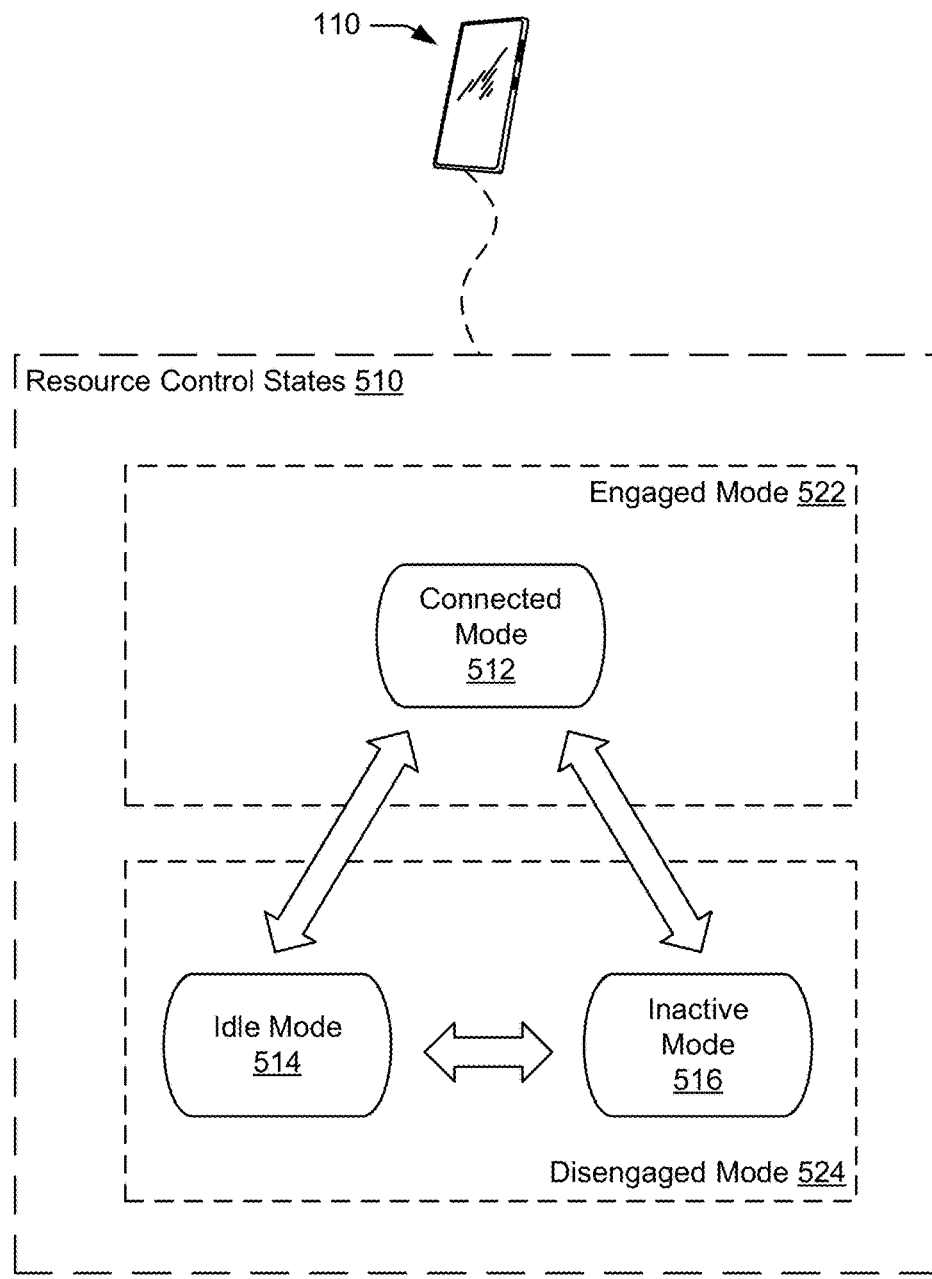
FIG. 5 illustrates example user equipment states which may implement various aspects of a UE-coordination set for disengaged mode.

FIG. 5 illustrates example user equipment states 500 which may benefit from aspects of a UE-coordination set for disengaged mode. A wireless network operator provides its telecommunication services to user equipment devices through a wireless network. To communicate wirelessly with the network, a user equipment 110 utilizes a radio resource control (RRC) procedure to establish a connection to the network via a cell (e.g., a base station, a serving cell). Upon establishing the connection to the network via the base station 121, the UE 110 enters a connected mode (e.g., RRC connected mode, RRC_CONNECTED state, NR-RRC CONNECTED state, E-UTRA RRC CONNECTED state).

The UE 110 operates according to different resource control states 410. Different situations may occur that cause the UE 110 to transition between the different resource control states 410 as determined by the radio access technology. Examples of the resource control states 510 illustrated in FIG. 5 include a connected mode 512, an idle mode 514, and an inactive mode 516. A user equipment 110 is either in the connected mode 512 or in the inactive mode 516 when an RRC connection is active. If an RRC connection is not active, then the user equipment 110 is in the idle mode 514.

In establishing an RRC connection, the user equipment 110 may transition from the idle mode 514 to the connected mode 512. After establishing the connection, the user equipment 110 may transition (e.g., upon connection inactivation) from the connected mode 512 to an inactive mode 516 (e.g., RRC inactive mode, RRC_INACTIVE state, NR-RRC INACTIVE state) and the user equipment 110 may transition (e.g., via an RRC connection resume procedure) from the inactive mode 516 to the connected mode 512. After establishing the connection, the user equipment 110 may transition between the connected mode 512 to an idle mode 514 (e.g., RRC idle mode, RRC_IDLE state, NR-RRC_IDLE state, E-UTRA RRC IDLE state), for instance upon the network releasing the RRC connection. Further, the user equipment 110 may transition between the inactive mode 516 and the idle mode 514.

Further, the UE 110 may be in an engaged mode 522 or may be in a disengaged mode 524. As used herein, an engaged mode 522 is a connected mode (e.g., the connected mode 512) and a disengaged mode 524 is an idle, disconnected, connected-but-inactive, or connected-but-dormant mode (e.g., idle mode 514, inactive mode 516). In some cases, in the disengaged mode 524, the UE 110 may still be Network Access Stratum (NAS) registered with radio bearer active (e.g., inactive mode 516).

Each of the different resource control states 510 may have different quantities or types of resources available, which may affect power consumption within the UE 110. In general, the connected mode 512 represents the UE 110 actively connected to (engaged with) the base station 121. In the inactive mode 516, the UE 110 suspends connectivity with the base station 121 and retains information that enables connectivity with the base station 121 to be quickly re-established. In the idle mode 514 the UE 110 releases the connection with the base station 121.

Some of the resource control states 510 may be limited to certain radio access technologies. For example, the inactive mode 516 may be supported in LTE Release 15 (eLTE), 5G NR, and 6G, but not in 3G or previous generations of 4G standards. Other resource control states may be common or compatible across multiple radio access technologies, such as the connected mode 512 or the idle mode 514.

Disengaged Mode UE-Coordination Set

As discussed above, the UE-coordination set 404 enhances the target UE's ability to transmit data to the base station 121 and receive data from the base station 121 by generally acting as a distributed antenna of the target UE 112. The UE-coordination set 404 may be used by UEs 111, 112, and 113 when those UEs are in the engaged mode 522. However, when one of the UEs 110 in a UE-coordination set transitions from the engaged mode 522 to the disengaged mode 524, that UE is no longer available to participate in joint reception and transmission of downlink data and uplink data with the other UEs 110 in the UE-coordination set 404.

Figure 6:
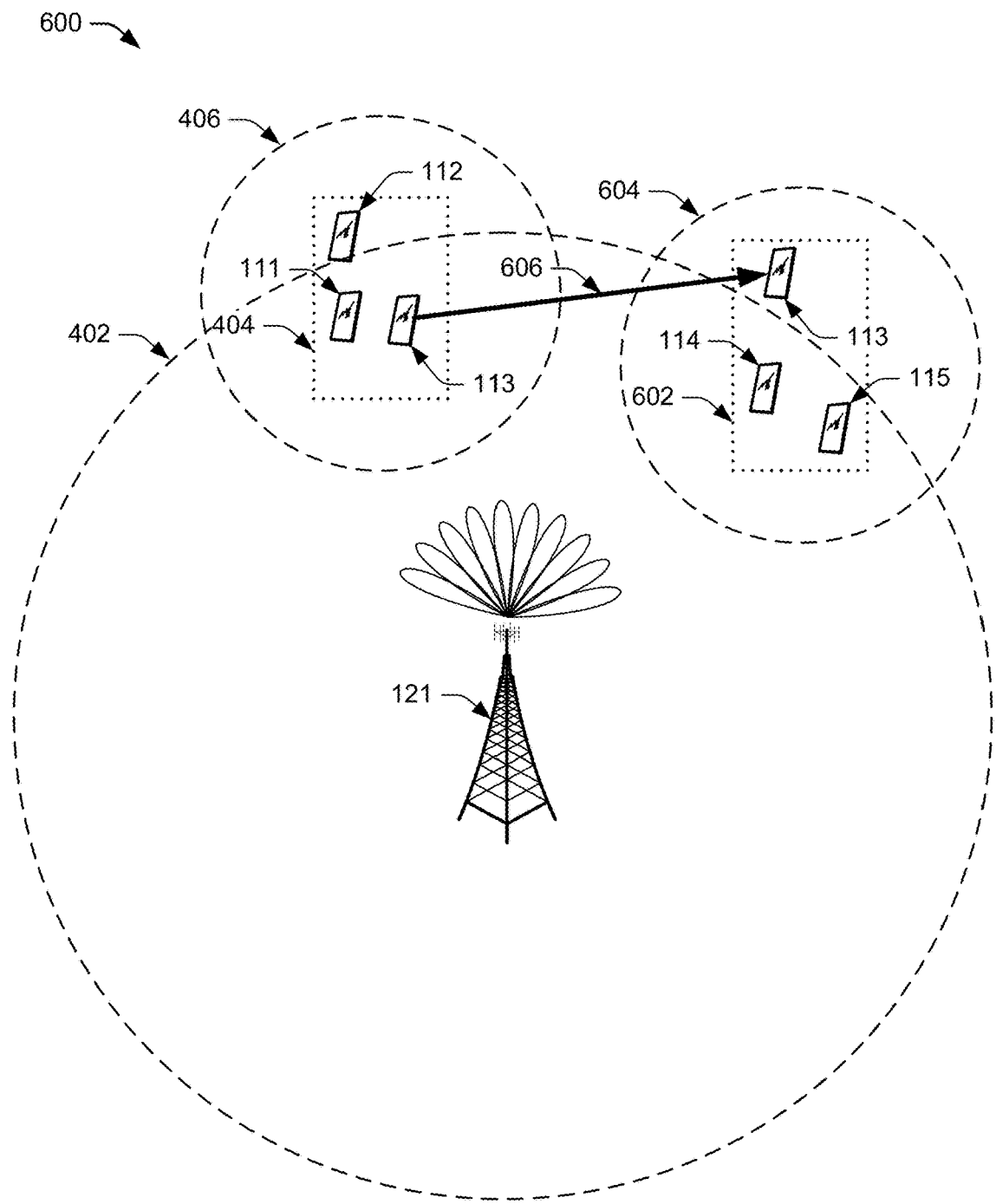
FIG. 6 illustrates an example environment in which various aspects of a UE-coordination set for disengaged mode can be implemented.

FIG. 6 illustrates an example implementation 600 of a UE-coordination set for disengaged mode. The illustrated example includes the base station 121, UE 111, UE 112, UE 113, UE 114, and UE 115. As described with reference to FIG. 4, the base station 121 can specify a set of UEs (e.g., the UE 111, UE 112, and UE 113) to form a UE-coordination set (e.g., the UE-coordination set 404, UECS 404) for joint transmission and joint reception of data for a target UE (e.g., the UE 112). The base station 121 can also specify a set of UEs to form a disengaged-mode-user-equipment coordination set (disengaged-mode UECS) (e.g., the disengaged-mode-user-equipment-coordination set 602, the disengaged-mode UECS 602) for joint transmission and joint reception of disengaged-mode communication for the UEs in the disengaged-mode UECS 602. Alternatively, the base station 121 can form a UE-coordination set including one or more UEs in the engaged mode and one or more UEs in the disengaged mode to implement the techniques described herein.

In aspects, the base station can identify and command (or request) a specific UE within the disengaged-mode UECS to act as a coordinating UE (e.g., master UE) for the disengaged-mode UE-coordination set. For example, the base station 121 can transmit a configuration message (e.g., request message) to the UE 114 to act as the coordinating UE for the disengaged-mode UECS 602. Communication between the UEs in the disengaged-mode UECS can occur using a local wireless network 604, such as a WLAN, PAN, NFC, Bluetooth, WiFi-Direct, local mmWave link, etc. In the alternative of a UE-coordination set including UEs in the engaged mode and UEs in the disengaged mode, the base station 121 can select a UE in the engaged mode or a UE in the disengaged mode as the coordinating UE.

As described above with reference to FIG. 6 and using the techniques described herein, the base station 121 can specify a set of UEs (e.g., the UE 113, UE 114, and UE 115) to form a the disengaged-mode UECS. The base station 121 may determine, based on information corresponding to the UEs (e.g., UE location, signal level, battery level, and so on), whether coordination is beneficial for a particular UE or not. For example, the base station 121 initially determines to include the UE 114 and the UE 115 in the disengaged-mode UECS 602. While it is in engaged mode 522, the base station 121 has assigned the UE 113 to the UECS 404. When it is determined that the UE 113 is to transition from the engaged mode 522 to the disengaged mode 524, the base station 121 moves, as illustrated at 606, the UE 113 from the UECS 404 to the disengaged-mode UECS 602. The base station 121 moves the UE 113 by removing the UE 113 from the UECS 404 and adding the UE 113 to the disengaged-mode UECS 602 using the messaging described above in reference to FIG. 4. Additionally, when it is determined that the UE 113 is to transition from the disengaged mode 524 to the engaged mode 522, the base station 121 moves the UE 113 from the disengaged-mode UECS 602 to the UECS 404 or another appropriate UECS.

In another aspect, the UEs in the disengaged-mode UECS perform joint reception of disengaged-mode transmissions from the base station 121 such as paging indications, system information updates, or the like. The base station 121 transmits a paging indication to the disengaged-mode UECS when any UE 110 in the disengaged-mode UECS has a pending page at the base station 121. The base station 121 assigns a UECS-specific identifier to each UECS managed by the base station 121. The base station 121 includes the UECS-specific identifier and an identifier of the UE 110 (target UE) that is being paged in the paging indication. For example, the base station 121 includes a UECS-specific identifier of the disengaged-mode UECS 602 and an identifier of the UE 113 in the paging indication when then base station is transmitting a paging indication for the UE 113.

The UE 110 indicated in a paging indication that is jointly received by a disengaged-mode UECS transitions to the engaged mode 522. In transitioning to the engaged mode 522, the paged UE 110 leaves the disengaged-mode UECS and may, optionally or additionally, join a different UE-coordination set. For example, the base station 121 includes the UECS-specific identifier of the disengaged-mode UECS 602 and an identifier of the UE 113 in the paging indication when then base station is transmitting a paging indication for the UE 113. The disengaged-mode UECS 602 jointly receives the paging indication and, based on the received paging indication, the UE 113 transitions to the engaged mode 522. Optionally or additionally, the base station 121 may command the UE 113 to rejoin the UE-coordination set 404 or another UE-coordination set.

In a further aspect, the base station configures the same discontinuous-reception cycle (DRX cycle) parameters, including a periodicity and an offset (e.g., a drx-StartOffset), for all the UEs 110 included in the disengaged-mode UECS. For example, the base station 121 determines DRX parameters for the UEs 110 in the disengaged-mode UECS 602 and communicates the DRX parameters in a Radio Resource Control (RRC) message to the UEs 110 in the disengaged-mode UECS 602.

Additionally or optionally, the base station may use UE-Capabilities parameters of the UEs 110 in a disengaged-mode UECS to determine DRX parameters. The base station can determine if all the UEs 110 in the disengaged-mode UECS support a particular DRX cycle (e.g., shortDRX-Cycle, or long DRX-Cycle). For example, if the base station 121 determines that all the UEs 110 support a shortDRX-Cycle, the base station 121 can configure the shortDRX-Cycle for all the UEs 110 in the disengaged-mode UECS 602 to provide a shorter response time to paging indication sent to the disengaged-mode UECS 602.

In another aspect, the base station 121 can combine UE-Capabilities parameters and/or other UE-related status information to determine DRX parameters that are common to all the UEs 110 in the disengaged-mode UECS. For example, the base station 121 determines that all the UEs 110 support a longDRX-Cycle and that the battery capacity of one or more UEs 110 in the disengaged-mode UECS 602 is low. Based on the combination of these factors, the base station 121 can configure the longDRX-Cycle for all the UEs 110 in the disengaged-mode UECS 602 to provide a longer battery life for the UEs 110 in the disengaged-mode UECS 602.

In a further aspect, a base station that manages a disengaged-mode UECS determines disengaged-mode UECS-specific cell reselection parameters for the disengaged-mode UECS and configures the UEs 110 in the disengaged-mode UECS with the disengaged-mode UECS-specific cell reselection parameters. For example, the base station 121 determines disengaged-mode UECS-specific cell reselection parameters that include a reception quality metric, such as a signal-to-noise ratio (SNR), for reference signals jointly-received by the UEs 110 in the disengaged-mode UECS 602.

If the jointly-received SNR for the reference signals drops below a threshold for the reception metric, the UEs 110 in the disengaged-mode UECS jointly perform cell reselection and coordinate on the reselection of a base station for the disengaged-mode UECS. For example, the coordinating UE 114 of the disengaged-mode UECS 602 determines that the SNR of the reference signals jointly-received by the UE 113, the UE 114, and the UE 115, from the base station 121, is below a threshold value. The UE 113, the UE 114, and the UE 115 jointly perform cell reselection. The disengaged-mode UECS 602, as coordinated by the coordinating UE 114, selects a base station with the highest jointly-received SNR to be a new camped base station (camped cell) for the disengaged-mode UECS 602.

In an additional aspect, if the disengaged-mode UECS selects a new camped cell that is in a different tracking area than the previous camped cell of the disengaged-mode UECS, the disengaged-mode UECS jointly transmits a tracking area update. For example, after cell reselection, the disengaged-mode UECS 602 determines that the new camped cell is in a tracking area that is not included in the Tracking Area list configured in the UEs 110 of the disengaged-mode UECS 602. The UEs 110 in the disengaged-mode UECS 602 jointly transmit a Tracking Area Update Request message to the newly camped base station (e.g., the base station 123) which directs the base station 123 to forward the Tracking Area Update Request to the core network (e.g., the 5G core network 150 or the Evolved Packet core network 160). After the core network processes Tracking Area Update Request, the base station 123 transmits a Tracking Area Update Accept message to the disengaged-mode UECS 602. The disengaged-mode UECS 602 jointly receives the Tracking Area Update Accept message and responds by jointly transmitting a Tracking Area Update Complete message to the base station 123.

Example Methods

Example methods 700 and 800 are described with reference to FIGS. 7 and 8 in accordance with one or more aspects of a UE-coordination set for disengaged mode. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

FIG. 7 illustrates example method(s) 700 of a UE-coordination set for disengaged mode as generally related to the base station 121. At 702, a base station (e.g., the base station 121) specifies a set of multiple user equipment (e.g., UE 113, UE 114, and UE 115) to form a disengaged-mode-user-equipment coordination set (e.g., the disengaged-mode-user-equipment coordination set 602), for joint transmission and reception of data intended for one or more of the multiple user equipment included in the disengaged-mode-user-equipment coordination set, each of the multiple user equipment being in a disengaged mode.

At 704, the base station selects one of the multiple user equipment within the disengaged-mode-user-equipment coordination set to act as a coordinating UE (e.g., the UE 114) for the disengaged-mode-user-equipment coordination set. At 706, the base station transmits a request message that directs the coordinating user equipment to coordinate the joint transmission and reception of the data intended for the one or more of multiple user equipment.

At 708, the base station transmits downlink signal to each user equipment within the disengaged-mode-user-equipment coordination set that is effective to enable each user equipment within the disengaged-mode-user-equipment coordination set to: demodulate and sample the downlink signal, and forward the samples to the coordinating user equipment; and enable the coordinating user equipment to:

combine the samples from each user equipment, and jointly process the combined samples to provide decoded data.

Figure 8:
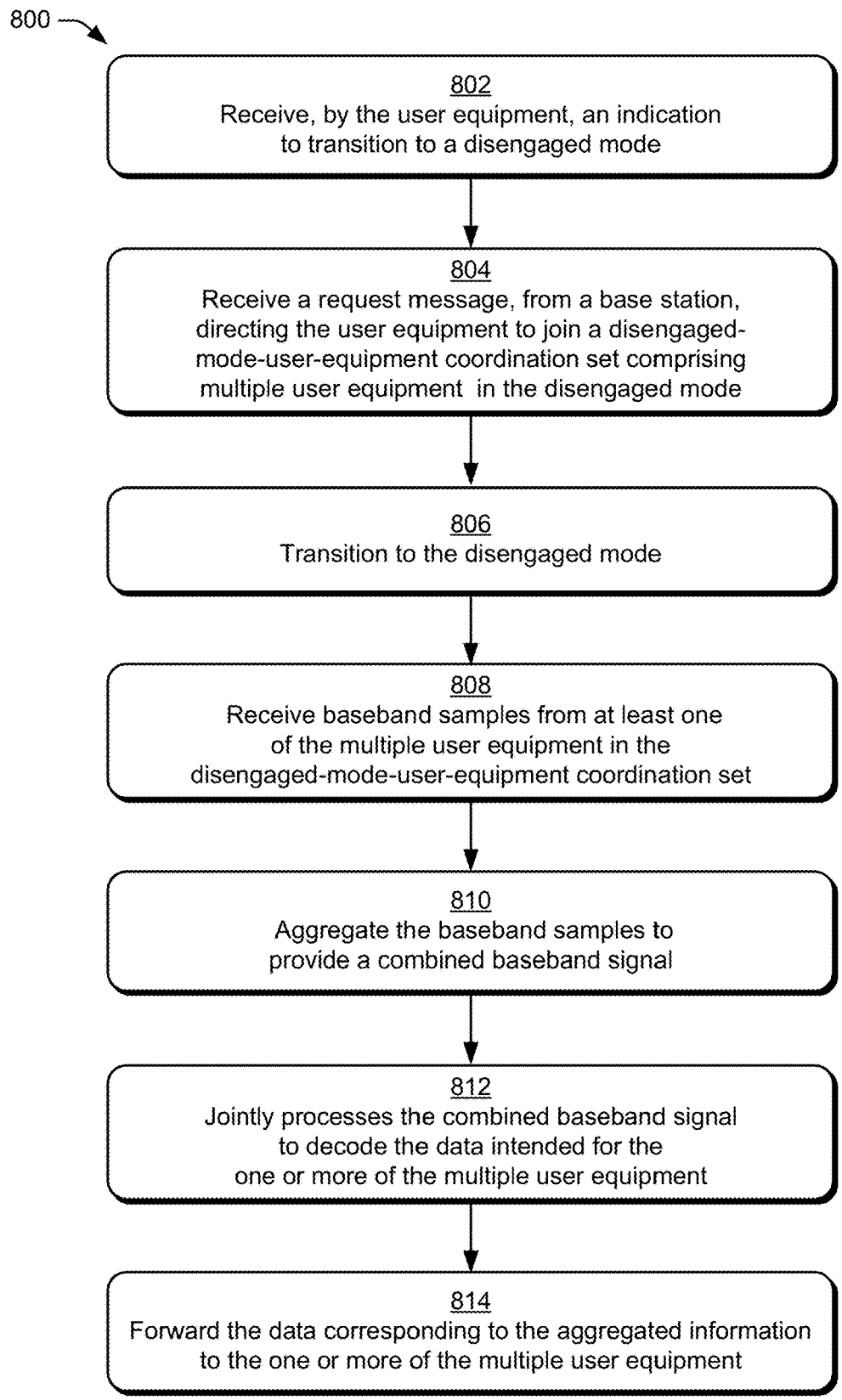
FIG. 8 illustrates an example method of a UE-coordination set for disengaged mode as generally related to the user equipment in accordance with aspects of the techniques described herein.

FIG. 8 illustrates example method(s) 800 of a UE-coordination set for disengaged mode as generally related to the user equipment 114. At 802, a user equipment (e.g., the user equipment 114) receives an indication to transition to a disengaged mode (e.g., the disengaged mode 524).

At 804, the user equipment receives a request message from a base station (e.g., the base station 121) directing the user equipment to join a disengaged-mode-user-equipment coordination set (e.g., the disengaged-mode-user-equipment coordination set 602) comprising multiple user equipment (e.g., UE 113, UE 114, and UE 115) in the disengaged mode. At 806, the user equipment transitions to the disengaged mode.

At 808, the user equipment receives baseband samples from at least one of the multiple user equipment in the disengaged-mode-user-equipment coordination set, the baseband samples corresponding to data intended for one or more of the multiple user equipment the disengaged-mode-user-equipment coordination set and received by the at least one user equipment in the disengaged-mode-user-equipment coordination set. At 810, the user equipment aggregates the baseband samples to provide a combined baseband signal.

At 812, the user equipment jointly processes the combined baseband signal to decode the data intended for the one or more of the multiple user equipment. At 814, the user equipment forwards data corresponding to the aggregated information to the one or more of the multiple user equipment.

In the following some examples are described:

Example 1: A method for using a disengaged-mode-user-equipment coordination set by a base station, the method comprising:
  specifying, by the base station, a set of multiple user equipment to form the disengaged-mode-user-equipment coordination set, for joint transmission and reception of data intended for one or more of the multiple user equipment included in the disengaged-mode-user-equipment coordination set, each of the multiple user equipment being in a disengaged mode;
  selecting one of the multiple user equipment within the disengaged-mode-user-equipment coordination set to act as a coordinating user equipment for the disengaged-mode-user-equipment coordination set;
  transmitting a request message that directs the coordinating user equipment to coordinate the joint transmission and reception of the data intended for the one or more of the multiple user equipment; and
  transmitting a downlink signal to each user equipment within the disengaged-mode-user-equipment coordination set effective to:
    enable each user equipment within the disengaged-mode-user-equipment coordination set to:
      demodulate and sample the downlink signal, and forward the samples to the coordinating user equipment; and
    enable the coordinating user equipment to:
      combine the samples from each user equipment, and jointly process the combined samples to provide decoded data.

Example 2: The method of example 1, wherein the transmitting the downlink signal comprises:
  transmitting a system information update, and the system information update directs each of the multiple user equipment to update system information it stores.

Example 3: The method of example 1 or example 2, further comprising:
  receiving, by the base station, a page for a target user equipment in the disengaged-mode-user-equipment coordination set; and
  wherein transmitting the downlink signal comprises:
    transmitting a paging indication that includes an identifier of the disengaged-mode-user-equipment coordination set and a target user equipment identity.

Example 4: The method of example 3, wherein jointly processing the combined samples to provide the decoded data is effective to direct the coordinating user equipment to forward the page to the target user equipment, and wherein the forwarding the page to the target user equipment is effective to direct the target user equipment to transition to an engaged mode.

Example 5: The method of example 3, wherein the paging indication is transmitted as a layer-3 message.

Example 6: The method of any one of the preceding examples, further comprising:
  configuring, by the base station, discontinuous reception parameters for the multiple user equipment in the disengaged-mode-user-equipment coordination set; and
  wherein transmitting the downlink signal comprises:
    transmitting the discontinuous reception parameters.

Example 7: The method of example 6, wherein the discontinuous reception parameters include discontinuous reception cycle parameters, and wherein the discontinuous reception cycle parameters include a periodicity and an offset for discontinuous reception by the multiple user equipment in the disengaged-mode-user-equipment coordination set, and wherein the discontinuous reception parameters are communicated in a Radio Resource Control message.

Example 8: The method of example 6, wherein configuring the discontinuous reception parameters for the multiple user equipment comprises:
  evaluating, by the base station, user equipment capability information for each of the multiple user equipment in the disengaged-mode-user-equipment coordination set to determine a configuration of the discontinuous reception parameters that can be commonly applied to all the user equipment in the disengaged-mode-user-equipment coordination set.

Example 9: The method of any one of the preceding examples, further comprising:
  configuring, by the base station, one or more cell reselection parameters for the disengaged-mode-user-equipment coordination set; and
  wherein transmitting the downlink signal comprises transmitting the one or more cell reselection parameters.

Example 10: The method of example 9, wherein the one or more cell reselection parameters include a threshold value for a reception metric, and wherein providing the one or more cell reselection parameters to at least the coordinating user equipment is effective to direct the coordinating user equipment to initiate cell reselection by the multiple user equipment included in the disengaged-mode-user-equipment coordination set if the reception metric for jointly-received reference signals from the base station is less than a threshold value for the reception metric.

Example 11: The method of any one of the preceding examples, further comprising:
  receiving, by the base station, a Tracking Area Update Request message from at least one user equipment of the multiple user equipment included in the disengaged-mode-user-equipment coordination set;

forwarding the Tracking Area Update Request to a core network;
in response to the forwarding, receiving a Tracking Area Update Accept message from the core network;
transmitting the Tracking Area Update Accept message to the disengaged-mode-user-equipment coordination set; and
receiving a Tracking Area Update Complete message from at least one user equipment of the multiple user equipment included in the disengaged-mode-user-equipment coordination set.

Example 12: A method performed by a user equipment configured as a coordinating user equipment for a disengaged-mode-user-equipment coordination set in a wireless communications network, the method comprising:
receiving, by the user equipment, an indication to transition to a disengaged mode;
receiving, by the user equipment, a request message from a base station directing the user equipment to join the disengaged-mode-user-equipment coordination set comprising multiple user equipment in the disengaged mode;
transitioning, by the user equipment, to the disengaged mode;
receiving baseband samples from at least one of the multiple user equipment in the disengaged-mode-user-equipment coordination set, the baseband samples corresponding to data intended for one or more of the multiple user equipment included in the disengaged-mode-user-equipment coordination set and received by the at least one user equipment in the disengaged-mode-user-equipment coordination set;
aggregating the baseband samples to provide a combined baseband signal;
jointly processing the combined baseband signal to decode the data intended for the one or more of the multiple user equipment; and
forwarding the decoded data to the one or more of the multiple user equipment.

Example 13: The method of example 12, wherein the decoded data comprises a system information update, the method further comprising:
forwarding, by the user equipment, the system information update to the multiple user equipment included in the disengaged-mode-user-equipment coordination set that is effective to direct each of the multiple user equipment to update system information stored in each of the multiple user equipment.

Example 14: The method of example 12 or example 13, wherein the decoded data comprises a paging indication that includes an identifier of the disengaged-mode-user-equipment coordination set and a target user equipment identity in the disengaged-mode-user-equipment coordination set, the method further comprising:
forwarding, by the user equipment, the paging indication to the indicated target user equipment, the forwarding being effective to direct the target user equipment to transition to an engaged mode.

Example 15: The method of example 14, wherein the paging indication is transmitted as a layer-3 message.

Example 16: The method of any one of examples 12 to 15, wherein the decoded data comprises discontinuous reception parameters for the multiple user equipment in the disengaged-mode-user-equipment coordination set, the method further comprising:
forwarding, by the user equipment, the discontinuous reception parameters to the multiple user equipment in the disengaged-mode-user-equipment coordination set, the forwarding being effective to direct the multiple user equipment to discontinuously-receive using the discontinuous reception parameters.

Example 17: The method of example 16, wherein the discontinuous reception parameters include discontinuous reception cycle parameters, and wherein the discontinuous reception cycle parameters include a periodicity and an offset for discontinuous reception by the multiple user equipment in the disengaged-mode-user-equipment coordination set, and wherein the discontinuous reception parameters are communicated in a Radio Resource Control message.

Example 18: The method of any one of examples 12 to 17, wherein the decoded data comprises one or more cell reselection parameters for the multiple user equipment in the disengaged-mode-user-equipment coordination set, the method further comprising:
forwarding, by the user equipment, the one or more cell reselection parameters to the multiple user equipment in the disengaged-mode-user-equipment coordination set, the forwarding being effective to direct the multiple user equipment to jointly determine whether to perform cell reselection using the one or more cell reselection parameters.

Example 19: The method of example 18, wherein the one or more cell reselection parameters include a threshold value for a reception metric, and wherein providing the one or more cell reselection parameters is effective to direct the user equipment to initiate cell reselection by the multiple user equipment included in the disengaged-mode-user-equipment coordination set if the reception metric for jointly-received reference signals from the base station is less than a threshold value for the reception metric.

Example 20: The method of any one of examples 12 to 19, the method further comprising:
jointly transmitting, by the user equipment, a Tracking Area Update Request message for the multiple user equipment included in the disengaged-mode-user-equipment coordination set that is effective to direct the base station to forward the Tracking Area Update Request to a core network;
jointly receiving a Tracking Area Update Accept message from the base station; and
jointly transmitting a Tracking Area Update Complete message to the base station.

Example 21: A base station comprising:
a wireless transceiver;
a processor; and
instructions for a base station manager application that are executable by the processor to configure the base station to perform any one of examples 1 to 11.

Example 22: A user equipment comprising:
a wireless transceiver;
a local wireless network transceiver;
a processor; and
instructions for a communication manager application that are executable by the processor to configure the user equipment to perform any one of examples 12 to 20.

Example 23: A computer-readable storage media comprising instructions that, responsive to execution by a processor, cause a method as recited in any one of examples 1 to 20 to be performed.

Although aspects of a UE-coordination set for disengaged mode have been described in language specific to features and/or methods, the subject of the appended claims is not necessarily limited to the specific features or methods described. Rather, the specific features and methods are disclosed as example implementations of the UE-coordination set for disengaged mode, and other equivalent features and methods are intended to be within the scope of the appended claims. Further, various different aspects are described, and it is to be appreciated that each described aspect can be implemented independently or in connection with one or more other described aspects.

What is claimed is:

1. A method for using a disengaged-mode-user-equipment coordination set by a base station, the method comprising:
    specifying, by the base station, a set of multiple user equipment to form the disengaged-mode-user-equipment coordination set, for joint transmission and reception of data intended for one or more of the multiple user equipment included in the disengaged-mode-user-equipment coordination set, each of the multiple user equipment being in a disengaged mode;
    selecting one of the multiple user equipment within the disengaged-mode-user-equipment coordination set to act as a coordinating user equipment for the disengaged-mode-user-equipment coordination set;
    transmitting a request message that directs the coordinating user equipment to coordinate the joint transmission and reception of the data intended for the one or more of the multiple user equipment; and
    transmitting a downlink signal to each user equipment within the disengaged-mode-user-equipment coordination set effective to:
        enable each user equipment within the disengaged-mode-user-equipment coordination set to:
            demodulate and sample the downlink signal, and
            forward the samples to the coordinating user equipment; and
        enable the coordinating user equipment to:
            combine the samples from each user equipment, and
            jointly process the combined samples to provide decoded data.

2. The method of claim 1, wherein the transmitting the downlink signal comprises:
    transmitting a system information update, and the system information update directs each of the multiple user equipment to update system information it stores.

3. The method of claim 1, further comprising:
    receiving, by the base station, a page for a target user equipment in the disengaged-mode-user-equipment coordination set; and
    wherein transmitting the downlink signal comprises:
    transmitting a paging indication that includes an identifier of the disengaged-mode-user-equipment coordination set and a target user equipment identity.

4. The method of claim 3, wherein the paging indication is transmitted as a layer-3 message.

5. The method of claim 1, further comprising:
    configuring, by the base station, discontinuous reception parameters for the multiple user equipment in the disengaged-mode-user-equipment coordination set; and
    wherein transmitting the downlink signal comprises:
    transmitting the discontinuous reception parameters.

6. The method of claim 5, wherein configuring the discontinuous reception parameters for the multiple user equipment comprises:
    evaluating, by the base station, user equipment capability information for each of the multiple user equipment in the disengaged-mode-user-equipment coordination set to determine a configuration of the discontinuous reception parameters that can be commonly applied to all the user equipment in the disengaged-mode-user-equipment coordination set.

7. The method of claim 1, further comprising:
    configuring, by the base station, one or more cell reselection parameters for the disengaged-mode-user-equipment coordination set; and
    wherein transmitting the downlink signal comprises:
    transmitting the one or more cell reselection parameters.

8. The method of claim 7, wherein the one or more cell reselection parameters include a threshold value for a reception metric.

9. The method of claim 1, further comprising:
    receiving, by the base station, a Tracking Area Update Request message from at least one user equipment of the multiple user equipment included in the disengaged-mode-user-equipment coordination set;
    forwarding the Tracking Area Update Request to a core network;
    in response to the forwarding, receiving a Tracking Area Update Accept message from the core network;
    transmitting the Tracking Area Update Accept message to the disengaged-mode-user-equipment coordination set; and
    receiving a Tracking Area Update Complete message from at least one user equipment of the multiple user equipment included in the disengaged-mode-user-equipment coordination set.

10. A method performed by a user equipment configured as a coordinating user equipment for a disengaged-mode-user-equipment coordination set in a wireless communications network, the method comprising:
    receiving, by the user equipment, an indication to transition to a disengaged mode;
    receiving, by the user equipment, a request message from a base station directing the user equipment to join the disengaged-mode-user-equipment coordination set comprising multiple user equipment in the disengaged mode;
    transitioning, by the user equipment, to the disengaged mode;
    receiving baseband samples from at least one of the multiple user equipment in the disengaged-mode-user-equipment coordination set, the baseband samples corresponding to data intended for one or more of the multiple user equipment included in the disengaged-mode-user-equipment coordination set and received by the at least one user equipment in the disengaged-mode-user-equipment coordination set;
    aggregating the baseband samples to provide a combined baseband signal;
    jointly processing the combined baseband signal to decode the data intended for the one or more of the multiple user equipment; and
    forwarding the decoded data to the one or more of the multiple user equipment.

11. The method of claim 10, wherein the decoded data comprises:
    a system information update;
    a paging indication that includes an identifier of the disengaged-mode-user-equipment coordination set and a target user equipment identity in the disengaged-mode-user-equipment coordination set;
    discontinuous reception parameters for the multiple user equipment in the disengaged-mode-user-equipment coordination set; or one or more cell reselection parameters for the multiple user equipment in the disengaged-mode-user-equipment coordination set.

12. The method of claim 11, wherein the decoded data comprises the paging indication, the method further comprising:
forwarding, by the user equipment, the paging indication to the identified target user equipment, the forwarding being effective to direct the target user equipment to transition to an engaged mode.

13. The method of claim 11, wherein the decoded data comprises the one or more cell reselection parameters for the multiple user equipment in the disengaged-mode-user-equipment coordination set, the method further comprising:
forwarding, by the user equipment, the one or more cell reselection parameters to the multiple user equipment in the disengaged-mode-user-equipment coordination set, the forwarding being effective to direct the multiple user equipment to jointly determine whether to perform cell reselection using the one or more cell reselection parameters.

14. A base station comprising:
a wireless transceiver;
a processor; and
instructions for a base station manager application that are executable by the processor to configure the base station to:
specify a set of multiple user equipment to form a disengaged-mode-user-equipment coordination set, for joint transmission and reception of data intended for one or more of the multiple user equipment included in the disengaged-mode-user-equipment coordination set, each of the multiple user equipment being in a disengaged mode;
select one of the multiple user equipment within the disengaged-mode-user-equipment coordination set to act as a coordinating user equipment for the disengaged-mode-user-equipment coordination set;
transmit a request message that directs the coordinating user equipment to coordinate the joint transmission and reception of the data intended for the one or more of the multiple user equipment; and
transmit a downlink signal to each user equipment within the disengaged-mode-user-equipment coordination set effective to:
enable each user equipment within the disengaged-mode-user-equipment coordination set to:
demodulate and sample the downlink signal, and forward the samples to the coordinating user equipment; and
enable the coordinating user equipment to:
combine the samples from each user equipment, and
jointly process the combined samples to provide decoded data.

15. The base station of claim 14, wherein the instructions to transmit the downlink signal are further executable to configure the base station to:
transmit a system information update, and the system information update directs each of the multiple user equipment to update system information it stores.

16. The base station of claim 14, wherein the instructions for the base station manager application are further executable by the processor to configure the base station to:
receive a page for a target user equipment in the disengaged-mode-user-equipment coordination set; and
wherein transmission of the downlink signal comprises:
transmitting a paging indication as a layer-3 message that includes an identifier of the disengaged-mode-user-equipment coordination set and a target user equipment identity.

17. The base station of claim 14, wherein the instructions for the base station manager application are further executable by the processor to configure the base station to:
configure discontinuous reception parameters for the multiple user equipment in the disengaged-mode-user-equipment coordination set; and
wherein the transmission of the downlink signal comprises:
transmitting the discontinuous reception parameters.

18. A user equipment comprising:
a wireless transceiver;
a local wireless network transceiver;
a processor; and
instructions for a communication manager application that are executable by the processor to configure the user equipment to:
receive an indication to transition to a disengaged mode;
receive a request message from a base station directing the user equipment to join a disengaged-mode-user-equipment coordination set comprising multiple user equipment in the disengaged mode;
transition to the disengaged mode;
receive baseband samples from at least one of the multiple user equipment in the disengaged-mode-user-equipment coordination set, the baseband samples corresponding to data intended for one or more of the multiple user equipment included in the disengaged-mode-user-equipment coordination set and received by the at least one user equipment in the disengaged-mode-user-equipment coordination set;
aggregate the baseband samples to provide a combined baseband signal;
jointly process the combined baseband signal to decode the data intended for the one or more of the multiple user equipment; and
forward the decoded data to the one or more of the multiple user equipment.

19. The user equipment of claim 18,
wherein the decoded data comprises:
a system information update;
a paging indication that includes an identifier of the disengaged-mode-user-equipment coordination set and a target user equipment identity in the disengaged-mode-user-equipment coordination set;
discontinuous reception parameters for the multiple user equipment in the disengaged-mode-user-equipment coordination set; or
one or more cell reselection parameters for the multiple user equipment in the disengaged-mode-user-equipment coordination set.

20. The user equipment of claim 19, wherein the decoded data comprises the paging indication, the instructions executable to configure the user equipment to:
forward the paging indication to the identified target user equipment, the forwarding being effective to direct the target user equipment to transition to an engaged mode.

* * * * *